(12) United States Patent
Tsunekawa et al.

(10) Patent No.: US 7,001,557 B2
(45) Date of Patent: Feb. 21, 2006

(54) BIAXIALLY ORIENTED POLYESTER FILM, AND A PRODUCTION METHOD THEREOF

(75) Inventors: Tetsuya Tsunekawa, Otsu (JP); Hirofumi Hosokawa, Otsu (JP); Takuji Higashioji, Kyoto (JP)

(73) Assignee: Toray Industries, Inc., Tokyo (JP)

( * ) Notice: Subject to any disclaimer, the term of this patent is extended or adjusted under 35 U.S.C. 154(b) by 418 days.

(21) Appl. No.: 10/118,910

(22) Filed: Apr. 10, 2002

(65) Prior Publication Data

US 2002/0167111 A1 Nov. 14, 2002

Related U.S. Application Data

(62) Division of application No. 09/393,819, filed on Sep. 10, 1999, now Pat. No. 6,420,011.

(30) Foreign Application Priority Data

| Sep. 11, 1998 | (JP) | 10-258061 |
| Feb. 24, 1999 | (JP) | 11-45971 |
| Feb. 25, 1999 | (JP) | 11-47999 |

(51) Int. Cl.
  *B29C 55/12* (2006.01)
  *B29C 47/00* (2006.01)
(52) U.S. Cl. .............. 264/210.7; 264/235.8; 264/290.2; 264/331.12
(58) Field of Classification Search ............ 264/210.7, 264/235.8, 290.2, 331.12
  See application file for complete search history.

(56) References Cited

U.S. PATENT DOCUMENTS

| 4,141,927 A | 2/1979 | White et al. |
| 4,226,826 A | 10/1980 | Motegi et al. |
| 4,908,419 A | 3/1990 | Holub et al. |
| 5,599,658 A | 2/1997 | Greener et al. |
| 5,770,301 A | 6/1998 | Murai et al. |
| 5,981,007 A * | 11/1999 | Rubin et al. ............... 428/35.5 |
| 6,420,011 B1 * | 7/2002 | Tsunekawa et al. ......... 428/141 |
| 6,599,991 B1 * | 7/2003 | Fehnel et al. ............... 525/425 |
| 6,783,889 B1 * | 8/2004 | Kubota et al. .............. 428/141 |
| 2002/0098372 A1 * | 7/2002 | Wong et al. ................ 428/523 |

FOREIGN PATENT DOCUMENTS

| EP | 0187476 A2 | 7/1986 |
| JP | 1315465 | 12/1989 |
| JP | 7228761 | 8/1995 |
| JP | 10/204268 | 1/1997 |

OTHER PUBLICATIONS

Poly (Ethylene Napthalenedicarboxylate) /Polyetherimide Blends, Research Disclosure XP-002124822, Nov. 1987 pp. 677-678.
J. Jang, et al., "Spectroscopic studies of the crystallization . . . ", Polymer, vol. 38 No. 16, 1997, pp. 4043-4048.
H. Chen, "Miscibility and Crystallization . . . ", Macromolecules, vol. 28, No. 8, 1995, pp. 2845-2851.
.M. Martinez, "Miscibility of Poly (ether imide) and Poly (ethylene terephthalate)", Journal of Applied Polymer Science, vol. 48, 1993, pp. 935-937.

* cited by examiner

*Primary Examiner*—Mark Eashoo
(74) *Attorney, Agent, or Firm*—Birch, Stewart, Kolasch & Birch, LLP

(57) ABSTRACT

An object of the present invention is to provide a biaxially oriented high quality polyester film excellent in thermal dimensional stability and clarity and also excellent in productivity, and also to provide a production process thereof. Another object is to provide a biaxially oriented polyester film greatly improved in the practical properties respected in various applications of the polyester film, such as the recording track shift in magnetic recording tape application, curling in magnetic recording card application, dimensional change during process in printing plate application, printing shift in ribbon application, thermostability in capacitor application, and perforation sensitivity and low temperature curling in heat-sensitive mimeograph stencil application.

The objects of the present invention can be achieved by a biaxially oriented polyester film, comprising a polyester (A) mainly composed of ethylene terephthalate and a polyether imide (B), having a single glass transition temperature, and having a refractive index of 1.60 to 1.80 at least in either the machine direction or the transverse direction.

3 Claims, No Drawings

BIAXIALLY ORIENTED POLYESTER FILM, AND A PRODUCTION METHOD THEREOF

This application is a divisional of application Ser. No. 09/393,819, filed on Sep. 10, 1999, now U.S. Pat. No. 6,420,011, the entire contents of which are hereby incorporated by reference and for which priority is claimed under 35 U.S.C. § 120; and this application claims priority of Application No. 258061/98; 45971/99; and 47999/99 filed in JAPAN on Sep. 11, 1998; Feb. 24, 1999; and Feb. 25, 1999 respectively under 35 U.S.C. § 119.

The present invention relates to a polyester film greatly improved in quality, and a production process thereof. In more detail, the present invention relates to a polyester film excellent in thermal dimensional stability and clarity and good in productivity, suitable as a film for various industrial materials, for example, as a magnetic recording film, packaging film, heat-sensitive mimeograph stencil film, capacitor film, thermal transfer ribbon film, photographic or printing plate making film, or electric insulation film, and also relates to a production process thereof.

Plastic films can be produced continuously as large area films which cannot be produced with other materials, and because of their features in strength, durability, clarity, flexibility and surface properties, they are used in fields needing them in large quantities such as magnetic recording, agriculture, packaging and building materials. Among them, biaxially oriented polyester films are used in various fields because of their excellent mechanical properties, thermal properties, electric properties and chemicals resistance, and especially as base films for magnetic tapes, they are unrivaled by other films in usefulness. However, depending on applications, polyester films are insufficient in dimensional stability and thermostability, and are limited in application as films for various industrial materials. Especially for magnetic recording, films are thinned and processed to allow recording at higher densities for miniaturization and longer-time recording, and the base films are demanded to be higher in strength and further improved in form stability and dimensional stability in the service environment. However, no effective means has been found to meet these demands. Furthermore, though raising the glass transition temperature of the polyester is generally an effective means for enhancing thermal dimensional stability and thermostability, no effective means has been established to obtain a biaxially oriented polyester film with high quality and high glass transition temperature.

On the other hand, as the prior art for enhancing the strength of a biaxially oriented polyester film, the longitudinal re-stretching method is generally practiced, in which a biaxially stretched film is re-stretched in the machine direction, to be enhanced in the strength in the machine direction. Furthermore, to enhance the strength also in the transverse direction, the longitudinal re-stretching and lateral re-stretching method is proposed, in which the longitudinally re-stretched film is re-stretched in the transverse direction (e.g., U.S. Pat. No. 4,226,826, etc.). When the higher strength polyester film obtained according to such prior art is used as a large capacity high density magnetic recording tape, it has a problem that desired electromagnetic conversion properties cannot be obtained since errors occur at the time of recording and reproducing due to the shift of the recording track caused by stress elongation deformation or dimensional change under environmental conditions.

For blends consisting of polyethylene terephthalate (PET) and a polyether imide (PEI), it is disclosed that the glass transition temperature rises with the increase of the PEI content (e.g., U.S. Pat. No. 4,141,927, "Journal of Applied Polymer Science, 48, 935–937 (1993)", "Macromolecule, 28, 2845–2851 (1995)", "Polymer, 38, 4043–4048 (1997)", etc.). However, these documents, patents and publications do not disclose a biaxially oriented high quality polyester film consisting of PET and a PEI, and do not describe at all the stretchability of the film, the film quality such as strength, thermal dimensional stability and clarify of the biaxially oriented polyester film, or the film properties for applications. Said U.S. Pat. No. 4,141,927 discloses a solution method or a melt method using a melt kneading apparatus for obtaining a compatible blend consisting of PET and a PEI. However, if the compatible blend prepared by using the solution method is cast into a sheet, the molecules of the solvent must be removed after film formation, and the film casting speed is low, making it difficult to form a film at a low cost. Furthermore, if a compatible blend is obtained by the melt method using a melt kneading apparatus such as Brabender or Banbury mixer, the polymers must be kneaded for a long time in a field of melt shearing, and this is unsuitable for industrial continuous film formation disadvantageously. Moreover, since the film made of a blend consisting of PET and a PEI produced by the conventional melt method contains many coarse particles mainly composed of a polyether imide, the film is often broken during biaxial stretching and the film surface has many coarse protrusions, not allowing use as a base film for high density magnetic recording disadvantageously. These problems are serious especially in the case of a biaxially oriented thin polyester film with a thickness of less than 10 $\mu$m and with higher strength, and a technological breakthrough for industrialization is desired.

Japanese Patent Laid-Open (Kokai) No. Hei7-228761 discloses a resin composition consisting of PET-polyethylene-2,6-napthalenedicarboxylic acid (PEN) copolymer (PET/N) and a PEI, and an injection-molded article made thereof. However, this invention relates to a partially compatible blend with more than one glass transition temperature, and is quite different from the present invention.

Japanese Patent Laid-Open (Kokai) No. Hei1-315465 discloses a composition consisting of a PET-PEI mixture (A) and ethylene-glycidyl methacrylate copolymer (B). However, this invention also relates to a non-compatible blend with more than one glass transition temperature, and is quite different from the present invention.

Japanese Patent Laid-Open (Kokai) No. Hei10-204268 discloses a hollow molded article made of a resin composition consisting of PET and a PEI, but does not describe at all about a biaxially oriented polyester film. Of course, it does not describe at all about the method for obtaining a biaxially oriented high quality polyester film or the method for decreasing the coarse particles.

As described above, any biaxially oriented high quality polyester film composed of a compatible blend consisting of PET and a PEI with a single glass transition temperature has not been found and has not been industrialized.

SUMMARY OF THE INVENTION

A problem of the present invention is to provide a biaxially oriented high quality polyester film excellent in thermal dimensional stability, clarity and also in productivity, and a production process thereof. Another problem is to provide a biaxially oriented polyester film greatly improved in practical properties highly respected in various applications of the polyester film, such as the recording track shift in magnetic recording tape application, curling in magnetic recording card application, dimensional change during processing in printing plate making application, printing shift in ribbon application, thermostability in capacitor application, and perforation sensitivity and low temperature curling in heat-sensitive mimeograph stencil application.

The inventors studied intensively to solve the above problems. As a result, they found at first that a film with a single glass transition temperature and with a refractive index of 1.60 to 1.80 at least in either the machine direction or transverse direction, obtained by melt-extruding a polyester (A) mainly composed of ethylene terephthalate and a polyether imide (B) by a specific method for forming a film can provide a biaxially oriented high quality polyester film excellent in thermal dimensional stability and clarity and small in thickness variation. Then, they pursued to enhance the quality of the film, and found that the preferable production method disclosed in the present invention can provide a biaxially oriented high quality polyester film with high stiffness, less coarse protrusions on the surface and excellent productivity to allow various applications.

The present invention is a biaxially oriented polyester film, comprising a polyester (A) mainly composed of ethylene terephthalate and a polyether imide (B), having a single glass transition temperature, and having a refractive index of 1.60 to 1.80 at least in either the machine direction or the transverse direction.

The present invention also provides a magnetic recording medium, capacitor, heat transfer ribbon or heat-sensitive mimeograph stencil, characterized by using said biaxially oriented polyester film.

Furthermore, the present invention also provides a process for producing a biaxially oriented polyester film, comprising the steps of melt-extruding a polyester (A) mainly composed of ethylene terephthalate and a polyether imide (B), to mold a resin sheet with a single glass transition temperature, and stretching the resin sheet at a ratio of 3.0 to 10 times in the machine direction and at a ratio of 3.0 to 10 times in the transverse direction.

Desirable Embodiments

The present invention is described below in detail.

The polyester (A) in the present invention refers to a polymer containing at least 70 mol % or more of ethylene terephthalate. To achieve the object of the present invention, it is preferable that the ethylene terephthalate content is 80 mol % or more, and more preferable is 95 mol % or more. The most preferable polyester (A) is polyethylene terephthalate. A main acid component is terephthalic acid, and a small amount of another dicarboxylic acid can also be copolymerized. A main glycol component is ethylene glycol, but another glycol can also be added as a comonomer. The dicarboxylic acids other than terephthalic acid include, for example, aromatic dicarboxylic acids such as naphthalenedicarboxylic acid, isophthalic acid, diphenylsulfonedicarboxylic acid, benzophenonedicarboxylic acid, 4,4'-diphenyldicarboxylic acid, and 3,3'-diphenyldicarboxylic acid, aliphatic dicarboxylic acids such as adipic acid, succinic acid, azelaic acid, sebacic acid, and dodecanedionoic acid, and alicyclic dicarboxylic acids such as hexahydroterephthalic acid, and 1,3-adamantanedicarboxylic acid. Glycols other than ethylene glycol include, for example, aromatic diols such as chlorohydroquinone, methylhydroquinone, 4,4'-dihydroxybiphenyl, 4,4'-dihydroxydiphenylsulfone, 4,4'-dihydroxydiphenyl sulfide, 4,4'-dihydroxybenzophenone, and p-xylene glycol, and aliphatic and alicyclic diols such as 1,3-propanediol, 1,4-butanediol, 1,6-hexanediol, neopentyl glycol, and 1,4-cyclohexane dimethanol. In addition to the acids and, glycols, an aromatic hydroxycarboxylic acid such as p-hydroxybenzoic acid, m-hydroxybenzoic acid or 2,6-hydroxynaphthoic acid, or p-aminophenol, p-aminobenzoic acid, etc. can be further copolymerized by such a small amount as not to impair the object of the present invention.

It is preferable in view of the melt kneadability with the polyether imide (B), film formability, and decomposability during melt extrusion, that the inherent viscosities of the raw materials of the polyester (A) used in the present invention are 0.55 to 2.0 dl/g. A more preferable range is 0.6 to 1.4 dl/g, and the most preferable range is 0.70 to 1.0 dl/g.

The polyether imide (B) in the present invention refers to a melt-moldable polymer containing an aliphatic, alicyclic or aromatic ether and cyclic imide group as recurring units. The polymers which can be used here include, for example, polyether imides stated in U.S. Pat. No. 4,141,927, and Japanese Patent Nos. 2622678, 2606912, 2606914, 2596565, 2596566 and 2598478, and polymers stated in Japanese Patent Nos. 2598536 and 2599171, Japanese Patent Laid-Open (Kokai) No. Hei9-48852, Japanese Patent Nos. 256556, 2564636, 2564637, 2563548, 2563547, 2558341, 2558339 and 2834580. As far as the effects of the present invention are not impaired, the polyether imide (B) can contain a structural component other than a cyclic imide or ether at the main chain, for example, an aromatic, aliphatic or alicyclic ester or oxycarbonyl.

In the present invention, it is preferable that the polyether imide has a glass transition temperature of 350° C. or lower. More preferable is 250° C. or lower. The condensation product of 2,2-bis[4-(2,3-dicarboxyphenoxy)phenyl]propane dianhydride and m-phenylenediamine or p-phenylenediamine is most preferable in view of the compatibility with the polyester (A), cost and melt moldability. This polyether imide is known as a trade name (registered trade name of General Electric) of "Ultem" 1000 series or "Ultem" 5000 series produced by General Electric.

It is essential that the biaxially oriented polyester film disclosed in the present invention consists of a polyester (A) and a polyether imide (B), and has a single glass transition temperature (Tg) and a refractive index of 1.60 to 1.80 at least in either the machine direction or the transverse direction.

The glass transition temperature in the present invention can be obtained according to JIS K 7121 from the heat flux gap during heating in the differential scanning thermal analysis. If it is difficult to judge the glass transition temperature only by the differential scanning thermal analysis, dynamic viscoelasticity measurement or a morphological method with microscope observation can also be used together. When the glass transition temperature is judged by the differential scanning thermal analysis, it is also effective to use the temperature modulation method or high sensitivity method. If the film has two or more glass transition temperatures, the polyester (A) and the polyether imide (B) are not compatible with each other in the film, and the effects of the present invention cannot be obtained. If both the refractive indexes in the machine direction and the transverse direction are less than 1.60, the thickness variation of the film becomes poor, and if the refractive indexes are more than 1.80 on the contrary, the biaxially oriented polyester film of the present invention cannot be obtained since the film is broken frequently. It is preferable in view of the thermal dimensional stability and the thickness variation of the film, that the refractive index at least in either the machine direction or the transverse direction is 1.63 to 1.72. A more preferable range is 1.64 to 1.70.

It is preferable in view of the stiffness and thermal dimensional stability of the film, that the density of the film of the present invention is 1.35 to 1.42 g/cm$^3$. A more preferable density range is 1.36 to 1.39, and a further more preferable density range is 1.37 to 1.38. For heat-sensitive mimeography application, as described in Example 27, it is effective to keep the density low for a higher heat shrinkage and heat shrinkage stress at a high temperature, and a density range of 1.34 to 1.35 is preferable. However, for such applications as magnetic recording tapes, floppy discs, thermal transfer ribbons, capacitors, and printing plates & cards, the above density range is preferable. It is preferable in view of the thermal dimensional stability and stiffness of the film, that the crystalline size of the polyester existing in the film in the (−105) direction corresponding to the main chain direction of the polyester is 15 Å to 55 Å. A more preferable range for thermal mimeography application is 15 Å to 35 Å, and a more preferable range for many other applications is 40 Å to 53 Å.

It is preferable that the face orientation factor of the film of the present invention is 0.03 to 0.19. If the face orientation factor is in this range, the decline of clarity during long-time storage and the film thickness variation can be prevented. A more preferable face orientation factor range in view of the effects achieved in the present invention is 0.08 to 0.175. A further more preferable range is 0.10 to 0.165.

In the present invention, it is preferable that the extrapolated glass transition onset temperature (Tg-onset) is 90 to 150° C. A more preferable Tg-onset range of the film is 95 to 130° C., and a further more preferable range is 100 to 120° C. If the Tg-onset is 90° C. or higher, the film is remarkably improved in thermal dimensional stability, and if the Tg-onset is 150° C. or lower, biaxial stretching is easy to allow a film with a high strength to be obtained.

Furthermore, in the present invention, it is preferable that the heat of crystal fusion ΔH of the polyester is 15 to 45 J/g. It is preferable for structural stabilization based on the existence of crystals and also for smaller heat shrinkage, that the heat of crystal fusion ΔH obtained from a differential scanning calorimeter (DSC) is 15 to 45 J/g. It is especially effective for keeping the heat shrinkage small at temperatures higher than the glass transition temperature of the film. A more preferable ΔH range is 25 to 40 J/g, and a further more preferable range is 30 to 38 J/g.

Moreover in the present invention, it is preferable that the number of coarse protrusions with a protrusion height of 0.5 μm or more on the surface is less than 30/100 cm$^2$. If the number of coarse protrusions with a protrusion height of 0.5 μm or more on the surface of the film is 30/100 cm$^2$ or more, it poses a problem not only for high density magnetic recording application but also for other various film applications, and also causes lower film stretchability, more frequent film breaking and less uniform stretchability. It is more preferable in view of film formability and clarity that the number of coarse protrusions with a protrusion height of 0.5 μm or more on the surface is less than 10/100 cm$^2$. and a further more preferable number is less than 5/100 cm$^2$. The coarse protrusions on the surface are mainly caused by the coarse particles mainly composed of the polyether imide (B). In the present invention, for counting the number of coarse protrusions on the surface, the electrostatic application method generally used for evaluating a film for magnetic recording media can be preferably used as a simple method, but any other publicly known method can also be used for counting. In the case of a film for industrial materials containing incorporated inorganic particles with an average particle size of 1 μm or more, the numbers of coarse protrusions on the surfaces in 100 visual fields selected at random are respectively counted and averaged, to obtain the number of coarse protrusions on the surface of the film. Whether or not the coarse protrusions with a protrusion height of 0.5 μm or more on the surface is mainly composed of the polyether imide (B) can be judged, for example, by judging whether they are an organic material or an inorganic material using SEM-XMA or analytical electron microscope, and then, if they are found to be organic, by examining the Raman intensity of the band (about 1770 cm$^{-1}$ in the case of polyether imide "Ultem" produced by General Electric preferably used in the present invention) assigned to the carbonyl stretching vibration of the imide ring, by the laser Raman measurement using a helium neon laser.

In the present invention, for various film applications, it is preferable that the haze value of the film is 0.1% to 15%. The haze value in the present invention refers to the internal haze value (%) as that of a 25 μm film measured with a film specimen immersed in tetralin according to JIS K 6714. In the present invention, if the haze value is 15% or less, a polyester film with excellent clarity can be obtained. It is industrially very difficult and not practically essential to keep the haze value at less than 0.1%. A more preferable haze value range is 0.3 to 10%, and a further more preferable range is 1.0 to 5.0%.

In the present invention, in view of quality such as stretchability, clarity and thermal dimensional stability of the film, it is preferable that the polyether imide (B) content of the film is 1 to 50 wt %. A more preferable range is 5 to 40 wt %, and a further more preferable range is 10 to 35 wt %. In order to knead the polyester (A) and the polyether imide (B) by an extruder for dissolving them each other, to improve the thermostability of the polyester (A), it is preferable that the polyether imide (B) content is 1 wt % or more. Furthermore, for obtaining a film with a high strength and thermal dimensional stability by biaxially stretching and heat-treating the melt-extruded film, it is preferable that the polyether imide (B) content is 50 wt % or less.

For decreasing surface defects, foreign matters and coarse protrusions on the surface and enhancing the film formability, it is preferable that the inherent viscosity (IV) of the film of the present invention is 0.55 dl/g to 2.0 dl/g. A more preferable inherent viscosity range is 0.60 to 1.0 dl/g, and a further more preferable range is 0.63 to 0.85 dl/g. The most preferable range is 0.65 to 0.80 dl/g. A film with an inherent viscosity of less than 0.55 is likely to be broken when formed into a film, and it is difficult to form a film stably. It must be noted that a film with an inherent viscosity of more than 2.0 generates much heat due to shearing during melt extrusion, to increase the thermal decomposition product and gelation product in the film, and therefore that a high quality polyester film is unlikely to be obtained.

In the present invention, in view of thermal dimensional stability, it is preferable that the heat shrinkages of the film in the machine direction and the transverse direction at 100° C. are 1% or less. More preferable is 0.5% or less. It should be noted that if the heat shrinkages at 100° C. are more than 1%, the magnetic tape obtained from the film is deformed due to the friction heat between the magnetic tape and the recording head, to be poor in skew property and tape storage property.

It is preferable that the Sum ($Y_{MD}+Y_{TD}$) of the Young's modulus ($Y_{MD}$) in the machine direction and the Young's modulus ($Y_{TD}$) in the transverse direction of the biaxially oriented film of the present invention is in a range of 8 to 25 GPa. A more preferable range is 10 to 20 GPa, and the most preferable range is 12 to 18 GPa. If the sum of Young's moduli is 8 GPa or more, a high quality film with small thickness variation and good thermal dimensional stability is likely to be obtained. Furthermore, if the sum of Young's moduli is 25 GPa or less, a biaxially oriented film with excellent clarity and film formability is likely to be obtained, and it is preferable also in view of tear resistance and heat shrinkage.

The thickness of the film of the present invention can be decided, as adequate, depending on the application and the purpose, but it is preferable that the thickness is 0.5 to 300 $\mu$m. To achieve the object of the present invention, less than 150 $\mu$m is more preferable, and less than 10 $\mu$m is further more preferable. For magnetic recording material application, a range of 1 $\mu$m to 15 $\mu$m is preferable, and for coating type magnetic data recording medium application, a range of 2 $\mu$m to 10 $\mu$m is preferable. For evaporation type magnetic data recording medium application, a range of 3 $\mu$m to 9 $\mu$m is preferable. For capacitor application, a preferable film thickness range is 0.5 to 15 $\mu$m. If the film thickness is in this range, a film with excellent dielectric breakdown voltage and dielectric properties can be obtained. For thermal transfer ribbon application, a preferable film thickness range is 1 to 6 $\mu$m. A more preferable range is 2 to 4 $\mu$m. If the film thickness is in this range, highly precise printing can be achieved without wrinkling, printing irregularity and ink over transfer. For heat-sensitive mimeograph stencil application, a preferable film thickness range is 0.5 to 5 $\mu$m. If the film thickness is in this range, the perforability at low energy is excellent, and the perforation diameter can be changed according to the energy level. Furthermore, also when color printing is executed using plural stencils, excellent printability can be obtained. For printing plates and cards, a preferable film thickness range is 30 to 150 $\mu$m. A more preferable range is 70 to 125 $\mu$m.

In the present invention, in view of various film applications and stable film formation, it is preferable that the thickness variation in the machine direction of the film is less than 15%. A more preferable thickness variation is less than 10%, and further more preferable is 8% or less. The most preferable thickness variation is less than 6%.

The film of the present invention can contain a compatibility improver, inorganic particles, organic particles and other various additives such as an antioxidant, antistatic agent and nucleating agent by such small amounts as not to impair the effects of the present invention. The compounds which can be used as the inorganic particles include, though not limited to, oxides such as silicon oxide, aluminum oxide, magnesium oxide and titanium oxide, compound oxides such as kaolin, talc and montmorillonite, carbonates such as calcium carbonate and barium carbonate, sulfates such as calcium sulfate and barium sulfate, titanates such as barium titanate and potassium titanate, and phosphates such as calcium tertiary phosphate, calcium secondary phosphate and calcium primary phosphate. Two or more of these compounds can also be used, depending on the purpose. The organic particles which can be used here include, though not limited to, vinyl based particles such as polystyrene particles, crosslinked polystyrene particles, styrene.acrylic particles, crosslinked styrene.acrylic particles, styrene.methacrylic particles, and crosslinked styrene.methacrylic particles, and particles of benzoguanamine.formaldehyde, silicone, tetrafluoroethylene, etc. Particles, at least part of which are organic high molecular particles insoluble in the polyester, can also be used. In view of lubricability and the uniformity of the protrusions formed on the film surface, it is preferable that the organic particles are spherical and have a uniform particle size distribution.

The size, amount, form of these particles can be selected to suit the application and purpose. Usually it is preferable that the average particle size is 0.01 $\mu$m to 3 $\mu$m, and the particles content is 0.01 wt % to 10 wt %.

The film of the present invention can also be a multilayered film consisting of two or more layers. A multilayered film consisting of two or more layers, especially as a base film for magnetic recording media, can be suitably designed to be different in surface roughness between the magnetic recording surface and the running surface on the other side, depending on the application.

A preferable production process of the present invention comprises the steps of melt-extruding a polyester (A) mainly composed of ethylene terephthalate and a polyether imide (B), to mold a resin sheet with a single glass transition temperature, and stretching the resin sheet at a ratio of 3.0 to 10 times in the machine direction and at a ratio of 3.0 to 10 times in the transverse direction.

In the present invention, it is preferable to stretch the film at ratios of 3.0 to 10 times respectively in the machine and transverse directions of the film. If the stretching ratios in the machine and transverse directions are less than 3 times, the thickness variation becomes large, and a biaxially oriented film with excellent thermal dimensional stability is unlikely to be obtained. It should be noted that if the stretching ratios are more than 10 times, the film is broken at a high frequency when stretched, to lower the productivity. It is preferable in view of stiffness and thermal dimensional stability that the total areal ratio of the film is 15 to 70 times. The most preferable range is 20 to 50 times. In this case, the total areal ratio refers to the product of the stretching ratio in the machine direction and the stretching ratio in the transverse direction. The stretching method can be either sequential biaxial stretching or simultaneous biaxial stretching. Furthermore, in the present invention, the ordinary biaxial stretching method of stretching once each in the machine direction and the transverse direction of the film can be used, and the longitudinal re-stretching method or the longitudinal re-stretching and lateral re-stretching method can also be suitably used. In the respective stretching of longitudinal stretching, lateral stretching, or simultaneous biaxial stretching, etc., the stretching in one direction can also be effected at least twice or more as multi-step stretching.

It is preferable that the heat treatment after biaxial stretching is effected in a temperature range of 100 to 260° C. It is preferable in view of higher thermal dimensional stability, though depending on the application of the film, that the heat treatment temperature is 150 to 240° C. The most preferable range is 180 to 240° C. It is preferable in view of the thermal dimensional stability and productivity of the film, that the heat treatment time is 0.1 to 20 seconds. A more preferable range is 0.5 to 10 seconds, and the most preferable range is 1 to 5 seconds. For the purpose of further improving the thermal dimensional stability of the film, it is also preferable that the film of the present invention is aged for a long time of 10 minutes to one month in a temperature range of 50° C. to the glass transition temperature of the film.

In the present invention, it is preferable to prepare a raw material blend consisting of the polyester (A) and the polyether imide (B) at 70/30~10/90 by weight as (A/B). It is preferable that the raw material blend is supplied into an extruder together with the polyester (A) and, as required, the reclaim material from the film, for lowering the polyether imide (B) content, to form the film with an intended composition.

If a raw material blend with a higher polyether imide (B) content is prepared and diluted when used, the coarse particles in the film can be remarkably decreased, and a biaxially oriented high quality polyester film with excellent productivity is likely to be obtained. It is considered that if the content of the polyether imide (B) with a high melt viscosity in a temperature range of 280 to 320° C. which is the ordinary melt extrusion temperature range of the polyester (A) is set in the above content range, the shear force during kneading can be enhanced, to remarkably decrease the coarse particles caused by poor dispersion of the polymer, etc. If the polyether imide (B) content in the raw material blend is less than 30 wt %, the coarse particles mainly composed of a PEI remain, and the above effect is unlikely to be obtained. On the contrary, if the polyether imide (B) content in the raw material blend is more than 90 wt %, since the shear heat generated by the extruder becomes large when the raw material blend is prepared, the thermal decomposition and gelation of the polyester (A) progress to lower the quality of the film, and when the raw material blend and the polyester (A) are supplied into the extruder again for melt mixing, both the polymers are not sufficiently dissolved with each other. As a result, the film of the present invention with a single glass transition temperature is unlikely to be obtained. In view of sufficient compatibility of the two polymers, though depending on the polyester (A) and the polyether imide (B) used, it is preferable to set the polyether imide (B) content in the raw material blend at 35 to 70 wt %. The most preferable range is 40 to 60 wt %. When the polyethylene terephthalate (A) and the polyether imide (B) are melt-mixed at a certain ratio to prepare a raw material blend, it is preferable to supply them into a vent two-screw kneading extruder heated at 270 to 300° C., for melting kneading. It is preferable that the shear rate of the extruder screw for preparing the raw material blend is 50 to 300 sec$^{-1}$. A more preferable range is 100 to 200 sec$^{-1}$. Furthermore, it is preferable that the melt kneading discharge time for preparing the raw material blend is 0.5 to 10 minutes. A more preferable range is 1 to 5 minutes.

The process for properly selecting and mixing the raw material blend, polyester (A) and, as required, the reclaim material from the film, and molding the mixture into a resin sheet with a single glass transition temperature is described below. In the present invention, it is preferable that the polyester (A) mainly composed of ethylene terephthalate and the polyether imide (B) as raw materials are mixed and supplied into an extruder, and that the mixture is molded into a resin sheet (1) at a screw shear rate of 30 second$^{-1}$ to less than 300 second$^{-1}$, (2) at a polymer temperature of 280° C. to 320° C., and (3) with the polymer discharge time set at 60 seconds to 10 minutes.

For said (1), it is more preferable that the screw shear rate (=πDN/h; D: diameter of screw, N: rotating speed of screw, h: groove depth of screw metering zone) of the extruder is 50 second$^{-1}$ to less than 250 second$^{-1}$, and in view of the prevention of thermal decomposition of the polyester (A) and the compatibility between the polyester (A) and the polyether imide (B), it is further more preferable that the shear rate is 90 second$^{-1}$ to less than 200 second$^{-1}$. The screw used for melt extrusion can be any type of screw such as full-flighted screw or barrier-flighted screw, but for promoting the fine dispersion of the polyester (A) or the polyether imide (B), achieving higher compatibility and decreasing coarse particles, it is preferable to use any of various mixing type screws of 20 or more, preferably 25 or more in the ratio of the length to diameter of the screw. A mixing type screw refers to a screw with a mixing zone at the position of the compression zone, or the metering zone or between both the zones, and can be, for example, a screw with a fluted barrier, Dulmage, Unimelt or multiple pin, etc. The extruder can be either a single screw or double screw extruder, but it is effective to use a high shear-low heat type screw. In the case of single screw type, a tandem extruder can also be preferably used. Furthermore, in the present invention, for the compatibility between the polyester (A) and the polyether imide (B) and for the inhibition of thermal decomposition of the polyester, it is preferable that the polymer temperature is 290° C. to 310° C. It is also preferable that the polymer discharge time is set at 90 seconds to 6 minutes. It is most preferable to set at 2 minutes to 4 minutes. The polymer temperature in this case refers to the temperature of the polymers passing at the center of the die tip directly measured by a thermocouple, and the polymer discharge time in this description refers to the value V/Q obtained by dividing the total volume V of the extrusion process including the extruder, nipple, filter and die by the discharged quantity Q of the polymers.

In the present invention, it is preferable that the average domain size of the dispersed domains existing in the raw material blend consisting of the polyester (A) and the polyether imide (B) is controlled at less than 1 μm by said preferable melt kneading method. The average domain size refers to the size of the dispersed domains of the polyester (A) or the polyether imide (B) forming a phase separated structure. In the present invention, in view of biaxial stretchability, clarity and the decrease of coarse particles on the surface, it is preferable that the average domain size in the blend chips is less than 0.5 μm. More preferable is less than 0.2 μm. If the average domain size is 1 μm or more, the dispersed domains remain in the melt-extruded cast film, and the biaxially oriented polyester film intended in the present invention is unlikely to be obtained.

For the raw material blend consisting of the polyester (A) and the polyether imide (B), it is preferable to select both the polymers to ensure that a polyester (A) with an inherent viscosity of 0.65 to 2.0 dl/g as a raw material and a polyether imide (B) with an inherent viscosity of 0.65 to 2.0 as a raw material are used to achieve an inherent viscosity ratio of 1.1 to 1.7 (the inherent viscosity of the polyester (A)/the inherent viscosity of the polyether imide (B)), for melt mixing. A more preferable inherent viscosity ratio of the polyester (A) to the polyether imide (B) as raw chips is 1.2 to 1.55.

The production process of the present invention is described below concretely in reference to a film consisting of PET and "Ultem" 1010 produced by General Electric, but the production method is changed to suit the raw materials used and the intended film application.

60 parts by weight of PET pellets (IV=0.85) obtained by ordinary polycondensation and 40 parts by weight of "Ultem" 1010 (IV=0.68) pellets are mixed and supplied to a vent double-screw kneading extruder heated to 290° C., and the mixture is extruded and pelletized at a predetermined shear rate, taking a predetermined discharge time, to obtain blend chips, in which the average domain size of dispersed "Ultem" domains is kept at less than 1 μm.

The blend chips consisting of PET and "Ultem" obtained by the above pelletization, raw PET chips, and, as required, the reclaim material from the film are mixed to achieve a PET/"Ultem" 1010 ratio by weight of 80/20, and the mixture is preliminarily dried at a low temperature as required, and dried in vacuum at 180° C. for 3 hours or more. The mixture is then supplied into an extruder, melt-extruded at 300° C., passed through a fiber stainless steel filter, and discharged as a sheet from a T die at a draw-down ratio of 2 to 30, and the sheet is brought into contact with a cooling drum with a surface temperature of 10 to 70° C., to be quickly cooled and solidified, for obtaining a substantially non-oriented film with a single glass transition temperature.

The cast film is heated by heating rolls of 50 to 180° C., preferably 80 to 130° C., more preferably 90 to 120° C., stretched at a total ratio of 3 to 10 times in the machine direction, and cooled by cooling rolls of 20 to 50° C. It is preferable that the ratio by one time of stretching in the machine direction is 1.1 to 6.0 times. A more preferable range is 1.5 to 4.0 times, and the most preferable range is 2.0 to 3.5 times. The film is then held by grips and introduced into a first tenter, being stretched at a total ratio of 3 to 10 times in the transverse direction. It is preferable that the ratio by one time of stretching in the transverse direction is 2.0 to 6.0 times. A more preferable range is 3.0 to 5.5 times. It is preferable that the stretching temperature is 50 to 180° C. A more preferable range is 80 to 130° C., and a further more preferable range is 90 to 120° C.

To further enhance the strength of the film, the film is heated by heating rolls of 100 to 260° C., preferably 120 to 250° C., more preferaby 130 to 240° C., re-stretched at a ratio of 1.1 to 5.0 times, preferably 1.4 to 3.5 times, more preferably 1.6 to 2.5 times in the machine direction, and cooled by cooling rolls of 20 to 50° C. Then, it is stretched again by a second tenter in the transverse direction. It is preferable that the stretching ratio is 1.1 to 3.0 times. A more preferable range is 1.2 to 2.5 times, and the most preferable range is 1.3 to 2.0 times. It is preferable that the stretching temperature is 100 to 260° C. A more preferable range is 120 to 250° C., and the most preferable range is 130 to 240° C.

Subsequently as required, the biaxially oriented film is introduced into temperature zones of 180 to 140° C. and 140 to 80° C., while being relaxed by 0.5 to 20% in the machine or transverse direction. It is then cooled to room temperature, and the film edges are removed to obtain the biaxially oriented polyester film of the present invention.

(Methods for measuring physical properties and evaluating effects)

The methods for measuring physical properties and evaluating effects were as follows.

(1) Inherent viscosity

The value calculated from the following formula based on the solution viscosity measured in ortho-chlorophenol at 25° C. was used.

$$\eta_{SP}/C=[\eta]+K[\eta]^2 \cdot C$$

where $\eta_{SP}$ is (solution viscosity/solvent viscosity)−1; C is the weight of the polymers dissolved per 100 ml of the solvent (g/100 ml, usually 1.2); and K is Huggins' constant (0.343). The solution viscosity and the solvent viscosity were measured using an Ostwald viscometer in [dl/g].

(2) Haze

Measured according to JIS K 6714 using a haze meter (produced by Suga Shikenki). The internal haze was measured with the sample immersed in tetralin, and it was expressed as that of a 25 µm film calculated from the following formula.

Haze (%)=Internal haze of film (%)×(25 (µm)/film thickness (µm))

(3) Glass transition temperature (Tg) and extrapolated glass transition onset temperature (Tg-onset)

The specific heat was measured according to the pseudo-isothermal method using the following instrument under the following conditions, and the Tg and Tg-onset were decided according to JIS K 7121.

Instrument: Temperature modulation DSC produced by TA Instrument

Measuring conditions:

Heating temperature: 270–570K (RCS cooling method)

Temperature calibration: Melting points of highly pure indium and tin

Temperature modulation amplitude: ±1K

Temperature modulation period: 60 seconds

Temperature rise steps: 5K

Sample weight: 5 mg

Sample container: Open container made of aluminum (22 mg)

Reference container: Open container made of aluminum (18 mg)

The glass transition temperature was calculated from the following formula.

Glass transition temperature=(Extrapolated glass transition onset temperature+Extrapolated glass transition end temperature)/2

(4) Melting temperature and heat of fusion

Measured according to JIS K 7122 using the same instrument under the same conditions as used for said (3).

(5) Average domain size

Blend chips consisting of a polyester (A) and a polyether imide (B) were cut, and the cut faces were observed with a transmission electron microscope. One hundred dispersed domains appearing on the cut faces were measured at random, and the average domain size D was obtained from the following formula.

$$D=\Sigma Di/100$$

where Di is a circle equivalent diameter of a dispersed domain. When the raw material blend was not formed as chips, it was embedded in resin, and its cut face was observed.

(6) Number of coarse protrusions with a protrusion height of 0.5 µm or more on the surface Two 100 cm² films were overlaid with the test surfaces kept in contact with each other by electrostatic force (applied voltage 5.4 kV), and the heights of coarse protrusions were judged in reference to Newton's rings generated by the light interference of the coarse protrusions between the two films. The coarse protrusions not smaller than the double rings were identified as coarse protrusions with a protrusion height of 0.5 µm or more on the surface, and counted. The light source was a halogen lamp applied through a 564 nm bandpass filter.

(7) Young's modulus

Measured according to the method specified in ASTM D 882, using an Instron type tensile tester under the following conditions:

Measuring instrument: Film strength-elongation automatic measuring instrument, "Tensilon AMF/RTA-100" produced by Orienteck.

Sample size: 10 mm wide, 100 mm gauge length

Tensile speed: 10 mm/min

Measuring environment: 23° C., 65% RH (8) Thermal dimensional stability

The heat shrinkage was measured according to JIS C 2318 under the following conditions:

Sample size: 10 mm wide, distance between gauge marks 200 mm

Measuring condition 1: 100° C., 30-minute treatment, no-load

Measuring condition 2: 65° C., 60-minute treatment, no-load

The heat shrinkage was obtained from the following formula:

Heat shrinkage (%)=[$(L_0-L)/L_0$]×100

$L_0$: Distance between gauge marks before heat treatment

L: Distance between gauge marks after heat treatment (9) Creep compliance

A 4 mm wide film was sampled, and set in TMA TM-3000 and heat control section TA-1500 produced by Shinku Riko K.K. at a gauge length of 15 mm. With a load of 28 MPa applied to the film at 50° C. and 65% RH for 30 minutes, the film elongation was measured. The film expansion (in %, $\Delta L$) was obtained through AD converter ADX-98E produced by Kanops K.K. using personal computer PC-9801 produced by NEC Corp., and the creep compliance was calculated from the following formula:

Creep compliance (GPa$^{-1}$)=($\Delta L$/100)/0.028

(10) Refractive index and face orientation factor ($f_n$)

The refractive index was measured according to JIS K 7105, with sodium D-line as the light source, using Abbe's refractometer Model 4 produced by K.K. Atago. Methylene iodide was used as the mount liquid, and measurement was effected at 23° C. 65% RH.

The face orientation factor ($f_n$) was obtained from the following formula based the measured respective refractive indexes: Face orientation factor ($f_n$)=($n_{MD}+n_{TD}$)/2-$n_{ZD}$ $n_{MD}$: Refractive index in the machine direction $n_{TD}$: Refractive index in the transverse direction $n_{ZD}$: Refractive index in the normal direction

(11) Density

The density of a film was measured according to the density gradient tube method of JIS K 7112 using sodium bromide aqueous solution.

(12) Crystalline size

Measured according to the transmission method under the following conditions using an X-ray diffractometer (Model 4036A2 produced by K.K. Rigaku Denki).

X-ray diffractometer: Model 4036A2 produced by K.K. Rigaku Denki

X-ray source: CuKα line (using Ni filter)

Output: 40 kV, 20 mA

Goniometer: Produced by K.K. Rigaku Denki

Slit: 2 mm φ-1°-1°

Detector: Scintillation counter

Counting recorder: Model RAD-C produced by K.K. Rigaku Denki

A sample was prepared by overlaying 2 cm×2 cm pieces in the same direction and immobilizing with collodion ethanol solution and set in the X-ray diffractometer. Of the 2θ/θ intensity data obtained by wide angle X-ray diffractometry, the half value widths of the face in the respective directions were used for calculation using the following Scherrer's formula. The crystalline size was measured in the main axial direction of orientation.

Crystalline size L (Å)=Kλ/$\beta_0\cos\theta_B$

K: Constant (=1.0)

λ: Wavelength of X rays (=1.5418 Å)

$\theta_B$: Bragg angle $\beta_0=(\beta_E^2-\beta_1^2)^{1/2}$ $\beta_E$: Apparent half value width (measured value)

$\beta_1$: Instrument constant (=1.046×10$^{-2}$)

(13) Breaking frequency

The film breaking caused during film formation was observed, and evaluated according to the following criterion:

⊚: Film breaking did not occur at all.

○: Film breaking rarely occurred.

Δ: Film breaking occurred sometimes.

X: Film breaking occurred frequently.

(14) Thickness variation in the machine direction of film

Film thickness tester "KG601A" and electronic micrometer "K306C" produced by Anritsu Corp. were used to continuously measure the thicknesses of a 30 mm wide 10 m long sample film in the machine direction of the film. The film feed rate was 3 m/min. From the maximum value Tmax (μm) and the minimum value Tmin (μm) of thicknesses of the 10 m long sample, the following was obtained R=Tmax−Tmin and based the R and the average thickness Tave (μm) of the 10 m long sample, the thickness variation was obtained from the following formula:

Thickness variation (%)=(R/Tave)×100

(15) Center line mean surface roughness (Ra)

A high precision thin film gap measuring instrument ET-10 produced by K.K. Kosaka Kenkyusho was used for measurement, to obtain the center line mean surface roughness (Ra) according to JIS B 0601 at a stylus tip radius of 0.5 μm, stylus pressure of 5 mg, measuring length of 1 mm and cutoff of 0.08 mm.

(16) Electromagnetic conversion property (C/N) of magnetic tape

The film of the present invention was doubly coated on the surface with a magnetic coating material and a non-magnetic coating material respectively composed as follows using an extrusion coater (a 0.1 μm thick upper layer of the magnetic coating material and a lower layer of the non-magnetic coating material changed in thickness), to be magnetically oriented, and dried. Then, on the other side, a back coat layer composed as follows was formed. The coated film was calendered by a small test calender (steel/steel rolls, 5 steps) at 85° C. at a linear pressure of 200 kg, and cured at 70° C. for 48 hours. The film destined to be tapes was slit in 8 mm width, and a pancake was prepared. From the pancake, a 200 m tape was taken and installed in a cassette as a cassette tape.

The tape was used in a marketed VTR for Hi8 (EV-BS3000 produced by Sony), and the C/N (carrier-to-noise ratio) at 7 MHz+1 MHz was measured. The C/N was compared with that of a marketed video tape for Hi8

(120-minute MP produced by Sony), and evaluated according to the following criterion:

○: +3 dB or more

Δ: +1 to less than +3 dB

X: less than +1 dB

A tape evaluated as ○ is desirable, but a tape evaluated as Δ can also be practically used.

(Composition of magnetic coating material)

| | |
|---|---|
| Ferromagnetic metal powder | 100 parts by weight |
| Sodium sulfonate modified vinyl chloride copolymer | 10 parts by weight |
| Sodium sulfonate modified polyurethane | 10 parts by weight |
| Polyisocyanate | 5 parts by weight |
| Stearic acid | 1.5 parts by weight |
| Oleic acid | 1 part by weight |
| Carbon black | 1 part by weight |
| Alumina | 10 parts by weight |
| Methyl ethyl ketone | 75 parts by weight |
| Cyclohexanone | 75 parts by weight |
| Toluene | 75 parts by weight |

(Composition of non-magnetic coating material as lower layer)

| | |
|---|---|
| Titanium oxide | 100 parts by weight |
| Carbon black | 10 parts by weight |
| Sodium sulfonate modified vinyl chloride copolymer | 10 parts by weight |
| Sodium sulfonate modified polyurethane | 10 parts by weight |
| Methyl ethyl ketone | 30 parts by weight |
| Methyl isobutyl ketone | 30 parts by weight |
| Toluene | 30 parts by weight |

(Composition of back coat layer)

| | |
|---|---|
| Carbon black (average particle size 20 nm) | 95 parts by weight |
| Carbon black (average particle size 280 nm) | 10 parts by weight |
| α alumina | 0.1 part by weight |
| Zinc oxide | 0.3 part by weight |
| Sodium sulfonate modified polyurethane | 20 parts by weight |
| Sodium sulfonate modified vinyl chloride copolymer | 30 parts by weight |
| Cyclohexanone | 200 parts by weight |
| Methyl ethyl ketone | 300 parts by weight |
| Toluene | 100 parts by weight |

(17) High speed abrasion resistance

A ½ inch wide tape obtained by slitting a film was run on a guide pin (surface roughness: 100 nm as Ra) using a tape runnability tester (running speed 250 m/min, 1 pass, wrap angle 60° C., running tension 90 g). After completion of tape running, the guide pin was visually observed, and the abrasionr esistance was evaluated according to the following criterion:

○: No abradings were observed.

Δ: Some abradings were observed.

X: Much abradings were obvserved.

A tape evaluated as ○ is desirable, but even a tape evaluated as Δ can be practically used.

(18) Running durability and storage property of magnetic tape

A film of the present invention was coated with a magnetic coating material composed as follows, to have a coating thickness of 2.0 μm, to be magnetically oriented, and dried. Then, on the other side, a back coat layer composed as follows was formed. The coated film was calendered and cured at 70° C. for 48 hours. A ½ inch wide 670 m magnetic tape obtained by slitting the above film was installed in a cassette as a cassette tape.

(Composition of magnetic coating material)

| | |
|---|---|
| Ferromagnetic metal powder | 100 parts by weight |
| Modified vinyl chloride copolymer | 10 parts by weight |
| Modified polyurethane | 10 parts by weight |
| Polyisocyanate | 5 parts by weight |
| Stearic acid | 1.5 part by weight |
| Oleic acid | 1 part by weight |
| Carbon black | 1 part by weight |
| Alumina | 10 parts by weight |
| Methyl ethyl ketone | 75 parts by weight |
| Cyclohexane | 75 parts by weight |
| Toluene | 75 parts by weight |

(Composition of back coat layer)

| | |
|---|---|
| Carbon black (average particle size 20 nm) | 95 parts by weight |
| Carbon black (average particle size 280 nm) | 10 parts by weight |
| α alumina | 0.1 part by weight |
| Modified polyurethane | 20 parts by weight |
| Modified vinyl chloride copolymer | 30 parts by weight |
| Cyclohexanone | 200 parts by weight |
| Methyl ethyl ketone | 300 parts by weight |
| Toluene | 100 parts by weight |

The prepared cassette tape was run for 100 hours using Magstar 3590 Model B1A Tape Drive produced by IBM, and the running durability of the tape was evaluated according to the following criterion. A tape evaluated as ○ is acceptable.

○: The tape was not elongated or bent at the edges and did not show any abradings.

Δ: The tape was not elongated or bent at the edges, but showed some abradings.

X: The tape was partially elongated at the edges, to be deformed like seaweed, and showed abradings.

The cassette tape prepared as above was set in Magstar 3590 Model B1A Tape Drive produced by IBM, to read data, and it was stored in an atmosphere of 50° C. and 80% RH for 100 hours. The data were reproduced, and the storage property of the tape was evaluated according to the following criterion. A tape evaluated as ○ is acceptable.

○: Without any track shift, data were reproduced normally.

Δ: The tape width was normal, but some data could not be read.

X: The tape width changed, and data could not be read.

(19) Tracking resistance of floppy disc

A. Tracking shift test under temperature change

For the tracking shift test, the following method was used. A base film was coated on both sides with thin metal films as magnetic recording layers, and the coated film was punched into floppy discs with thin metal films. Each floppy disc was magnetically recorded using a ring head at 15° C. and 60% RH, and the maximum output and the output envelope of the magnetic sheet were measured. Then, with the atmosphere kept at 60° C. and 60% RH, the maximum output and the output envelope at the temperature were examined. The output envelope at 15° C. and 60% RH was compared with the output envelope at 60° C. and 60% RH, to evaluate the tracking condition. A smaller difference means more excellent tracking resistance. The tracking resistance was evaluated according to the following criterion:

X . . . The difference was more than 3 dB.

○ . . . The difference was 3 dB or less.

B. Tracking shift test under humidity change

A floppy disc prepared as described above was recorded in an atmosphere of 25° C. and 20% RH, and was placed in an atmosphere of 25° C. and 70% RH. The output envelops under both the conditions were compared to evaluate the tracking condition according to the following criterion:

X: The difference was more than 3 dB.

○: The difference was 3 dB or less.

(20) Scratch resistance of floppy disc

A floppy disc obtained as described in the above (19) was magnetically recorded, and the same track was scanned at a relative running speed of 6 m/second more than 10,000 times, to examine the output envelops. The scratch resistance was evaluated according to the following criterion:

X: The magnetic layer was flawed on the surface, and the output envelop became unstable.

○: The magnetic layer was not flawed on the surface, and the output envelop was stable.

(21) Printability of heat transfer ribbon

A biaxially oriented film of the present invention was coated with a heat transfer ink composed as follows, to have a coating thickness of 3.5 $\mu$m on the side opposite to a fusion preventive layer, using a hot melt coater, to prepare a heat transfer ribbon.

| (Composition of heat transfer ink) | |
|---|---|
| Carnauba wax | 60.6 wt % |
| Microcrystalline wax | 18.2 wt % |
| Vinyl acetate · ethylene copolymer | 0.1 wt % |
| Carbon black | 21.1 wt % |

The prepared heat transfer ribbon was printed in solid black using a bar code printer (BC-8) produced by Oaks, to evaluate the printability. A ribbon evaluated as ○ is acceptable.

○: Printed clearly.

Δ: Printing shifted in pitch.

X: The ribbon was wrinkled, and the printing was disordered.

XX: The film was wrinkled during hot melt coating, and the heat transfer ink could not be applied uniformly.

(22) Evaluation of properties for capacitor

A. Insulation resistance

A pair of 30 mm wide symmetrical aluminum deposited film with 1.5 mm wide margins were overlaid and wound to a length of giving a capacity of 1.5 $\mu$F. The winding was pressed at 150° C. at a pressure of 70 kg/cm$^2$ for 10 minutes, to be formed. At both the end faces, metallikon was thermally sprayed to form electrodes, and lead wires were attached to make a capacitor sample. One thousand 1.5 $\mu$F capacitor samples produced like this were placed in an atmosphere of 23° C. and 65% RH, and their insulation resistances were measured as 1-minute values with a voltage of 500 V applied using super-insulation resistance tester, 4329A produced by YHP. A capacitor sample of less than 5000 MΩ in insulation resistance was counted as a defective sample. The insulation resistance was evaluated according to the following criterion. In the present invention, lots evaluated as ⊚, ○ and Δ are acceptable.

⊚: Less than 10 defective samples.

○: 10 to less than 20 defective samples.

Δ: 20 to less than 50 defective samples.

X: 50 or more defective samples.

B. Dielectric breakdown voltage

Evaluated as follows according to the method described in JIS C 2318, but using a non-metallized film as a specimen.

An about 2 mm thick rubber sheet with a Shore hardness of about 60 degrees was laid on a properly sized metallic flat sheet, and ten about 6 $\mu$m thick aluminum foils were overlaid on it, to make a bottom electrode. A brass cylinder with a weight of about 50 g, and a diameter of 8 mm having a radius of about 1 mm around it, and smooth and flawless at the bottom was used as a top electrode.

Tests were performed under the following two conditions, to measure the dielectric breakdown voltages at room temperature and a high temperature. At first, the top and bottom electrodes were allowed to stand in either of the atmospheres for more than 48 hours, and a sample was kept between them. In the atmosphere, a DC voltage was applied between both the electrodes from a DC power source, and it was raised from 0 V at a rate of 100 V per second till dielectric breakdown was caused. This test was performed with 50 samples. Each dielectric breakdown voltage was divided by the thickness of the sample, and the average value of 50 samples was obtained. When the value was 400 V/$\mu$m or more under the condition 1, or 350 V/$\mu$m or more under the condition 2, the lot was evaluated to be acceptable (○).

Condition 1: 20±5° C., 65±5% RH

Condition 2: 125±5° C., 65±5% RH

(23) Practical properties for thermal mimeography

A film and a sheet of Japanese paper were bonded together to prepare a heat-sensitive mimeograph stencil. The obtained heat-sensitive mimeograph stencil had a character image and a 16-step gradated image formed by a thermal head with an energy of 0.09 mJ or 0.12 mJ applied, to make a stencil. The perforation of the gradated image was observed from the film side. of the stencil using a microscope, and the following items were evaluated.

A. Perforation sensitivity

α: Predetermined perforation was well effected reliably.

Δ: Predetermined perforation was not perfectly effected though there was no practical problem.

X: Predetermined perforation was not effected at many portions, posing a practical problem.

B. Independent perforability

α: Dots were independently perforated.

Δ: Dots were almost independently perforated without any practical problem.

X: Adjacent dots were continuous, to pose a practical problem.

Furthermore, the stencil was used for printing by Risograph AP7200 produced by Riso Kagaku Kogyo K.K., and the obtained characters and image were visually evaluated on the following properties.

C. Character printability

○: The stencil had no problem at all in view of character missing or character thickness variation.

Δ: The stencil could be practically used though some character missing and thickness variation were caused.

X: The stencil could not be practically used because of an obvious problem in the character missing or character thickness variation.

D. Evaluation of solid printability

A stencil with closed circles of 0.5, 1.0, 3.0, 10.0 and 30.0 mm in diameter was used for printing and evaluated according to the following criterion.

○: The stencil had no problem at all in view of accurate reproduction of solid printing and shade variation.

Δ: The stencil could be used though there was some problem in view of accurate reproduction of solid printing and shade variation.

X: The stencil could not be used because of an obvious problem in accurate reproduction of solid printing and shade variation.

The present invention is described below based on examples and comparative examples.

EXAMPLE 1

Pellets of PET with an inherent viscosity of 0.85 (50 wt %) and "Ultem" 1010 with an inherent viscosity of 0.68 produced by General Electric (50 wt %) were supplied into a vent two-screw kneading extruder rotating in the same direction heated to 290° C., to prepare blend chips containing 50 wt % of "Ultem". The obtained chips were slightly white turbid, and the average domain diameter of the dispersed domains was 0.5 $\mu$m.

Then, 40 parts by weight of the blend chips obtained by the above pelletization and 60 parts by weight of PET chips with an inherent viscosity of 0.65 were dried in vacuum at 180° C. for 3 hours and supplied into a single-screw extruder having a 150 mm dia. screw and heated to 290° C., and the mixture was melt-extruded under the conditions of Table 1, passed through a fiber stainless steel filter (5 $\mu$m cut) at a shear rate of 10 second$^{-1}$, and discharged as a sheet from a T die. The sheet was brought into contact with a cooling drum with a surface temperature of 25° C. at a draw-down ratio of 10 at a speed of 30 m/min, to be solidified and quickly cooled, to obtain a substantially non-oriented cast film.

In succession, the cast film was stretched at a ratio of 3.8 times in the machine direction at 105° C. by a longitudinal stretcher consisting of plural heated rolls, using the peripheral speed differences of the rolls. Then, the film was held by grips at both the edges, introduced into a tenter, stretched in the transverse direction at a ratio of 4 times at a stretching temperature of 100° C., heat-treated at 210° C., relaxed by 2% and 1% in the transverse direction respectively in two cooling zones controlled at 150° C. and 100° C., cooled to room temperature, and got the film edges removed, to obtain a 9 $\mu$m thick biaxially oriented polyester film.

The blend ratio, melt extrusion conditions and stretching ratios are shown in Table 1. The inherent viscosity, refractive index, density, face orientation factor, glass transition temperature (Tg), extrapolated glass transition onset temperature (Tg-onset), the crystalline size in the (−105) direction of the polyester and the breaking frequency during film formation, of the obtained film are shown in Table 2. The heat of fusion, the number of coarse protrusions with a protrusion height of 0.5 $\mu$m or more on the surface, haze, Young's modulus, 100° C. heat shrinkage, and creep compliance are shown in Table 3. Since the film obtained here had a single glass transition temperature and conformed to the present invention in refractive index, it was a high quality polyester film good in thickness variation, and excellent in clarity and thermal dimensional stability. Furthermore, when the film was formed, film breaking little occurred, showing good productivity.

EXAMPLES 2 TO 4

Polyester films consisting of PET and "Ultem" were obtained as described for Example 1, except that the melt extrusion conditions were as shown in Table 1. The film properties are shown in Tables 2 and 3. They were good in thickness variation and thermal dimensional stability, but since the extrusion conditions deviated from preferable conditions, the films were rather poor in clarity compared to the film of Example 1. Furthermore, the number of coarse protrusions on the surface increased.

EXAMPLES 5 AND 6

Films were formed as described for Example 1, except that the "Ultem" content and film forming conditions were as shown in Table 1. The film properties are shown in Tables 2 and 3. Even if the "Ultem" content was changed, high quality polyester films with a single glass transition temperature, less coarse protrusions on the surface, good clarity and excellent thermal dimensional stability could be obtained.

EXAMPLE 7

A film was formed as described for Example 1, except that PET chips with an inherent viscosity of 0.75 were supplied into an extruder together with the blend chips. The film properties are shown in Table 2 and 3. When the inherent viscosity of the film was raised, the coarse protrusions on the surface further decreased, and a film excellent in clarity and thermal dimensional stability could be obtained. The film breaking during film formation did not occur at all.

EXAMPLES 8 TO 10

Films were formed as described for Example 7, except that the contents of PET and "Ultem" or the inherent viscosity of the raw PET were changed as shown in Table 4 for preparing blend chips. The film properties are shown in Tables 2 and 3. When the "Ultem" content was raised, the average domain diameters of the dispersed domains existing in the blend chips diminished, but the coarse protrusions on the surface somewhat increased. On the other hand, when the inherent viscosity of PET was raised to set the inherent viscosity ratio of PET and "Ultem" in the more preferable range of the present invention, the average domain size of the dispersed domains in the blend chips diminished, and the coarse protrusions on the surface of the film obtained after melt extrusion and biaxial stretching were not observed at all.

COMPARATIVE EXAMPLE 1

Without preparing blend chips beforehand, 80 parts by weight of PET with an inherent viscosity of 0.65 and 20 parts by weight of "Ultem" 1010 with an inherent viscosity of 0.68 were dried in vacuum at 180° C. for 3 hours, and supplied into a single-screw extrude having a 150 mm dia. screw heated to 290° C., being melt-extruded under the conditions shown in Table 1. The substantially non-oriented cast film obtained here had two glass transition temperatures and could not be stretched. The cast film contained innumerable coarse particles.

COMPARATIVE EXAMPLE 2

Melt extrusion and film formation were carried out as described for Example 1, to obtain a 9 μm thick biaxially oriented polyester film, except that PET alone was used as a raw material without using any PEI. The film properties are shown in Tables 2 and 3. The film was large in thickness variation and very poor in thermal dimensional stability since it did not contain any PEI, though it had no special problem in clarity or surface properties.

COMPARATIVE EXAMPLE 3

A cast film containing 20 wt % of a PEI was formed as described for Example 1. The cast film was stretched at a ratio of 2.8 times in the machine direction at 125° C. using a longitudinal stretcher consisting of plural heated rolls, using the peripheral speed differences of the rolls. Then, the film was held by grips at both the edges, introduced into a tenter, stretched in the transverse direction at a ratio of 2.8 times at a stretching temperature of 120° C., heat-treated at 150° C. for 0.1 second, cooled to room temperature, and got the film edges removed, to obtain a 9 μm thick biaxially oriented polyester. film. The film properties are shown in Table 2 and 3.

The biaxially oriented film obtained here was less than 1.60 in refractive index in both the machine and transverse directions, and very large in thickness variation.

COMPARATIVE EXAMPLE 4

A film was formed as described for Comparative Example 3, to obtain a 9 μm thick biaxially oriented polyester film, except that the heat treatment after biaxial stretching was effected at 210° C. for 2 seconds. The film properties are shown in Tables 2 and 3. The biaxially oriented film obtained here was less than 1.60 in refractive index in both the machine and transverse directions and very large in thickness variation.

COMPARATIVE EXAMPLE 5

Melt extrusion was effected as described for Example 1, to obtain a cast film, except that PET alone was used as a raw material without using any PEI.

The cast film was stretched at a ratio of 2.0 times in the machine direction at 120° C., and stretched at 80° C. to 2.7 times. It was held by grips at both the edges, introduced into a tenter, stretched in the transverse direction at a ratio of 4 times at a stretching temperature of 100° C., heat-treated at 210° C., relaxed by 2% and 1% in the transverse direction respectively in cooling zones controlled at 150° C. and 100° C., cooled to room temperature, and got the film edges removed, to obtain a 9 μm thick biaxially oriented polyester film. The film properties are shown in Tables 2 and 3. The film was large in thickness variation and very poor in thermal dimensional stability since it did not contain any PEI, though it had no special problem in clarity or surface properties.

COMPARATIVE EXAMPLE 6

A raw material blend was prepared as described for Example 1, and 40 wt % of the raw material blend and 60 wt % of PET with an inherent viscosity of 0.65 were supplied into an extruder, to prepare a cast film.

The cast film was attempted to be stretched as described for Comparative Example 5. It was at first stretched at a ratio of 2.0 times in the machine direction at 120° C. Then, it was attempted to be stretched to 2.7 times at 80° C., when the film broke not allowing a biaxially oriented film to be obtained.

The monoaxially oriented film stretched to 2 times in the machine direction had a thickness variation of 22% and a heat shrinkage of 45% at 100° C. in the machine direction, and very poor in quality compared to the biaxially oriented film of the present invention.

TABLE 1

| | PET/PEI content ratio by weight | Melt extrusion conditions | | | | Stretching ratio Longitudinal ratio × Transverse ratio |
|---|---|---|---|---|---|---|
| | | Master chips | Shear rate (second$^{-1}$) | Polymer temperature (° C.) | Discharge time (min) | |
| Example 1 | 80/20 | Used | 150 | 300 | 4.0 | 3.8 × 4.0 |
| Example 2 | 80/20 | Used | 180 | 300 | 0.8 | 3.8 × 4.0 |
| Example 3 | 80/20 | Used | 200 | 325 | 4.0 | 3.8 × 4.0 |
| Example 4 | 80/20 | Used | 25 | 300 | 4.0 | 3.8 × 4.0 |
| Comparative Example 1 | 80/20 | Not used | 320 | 332 | 12.0 | Could not be stretched. |
| Example 5 | 60/40 | Used | 120 | 305 | 4.4 | 3.5 × 3.8 |
| Example 6 | 90/10 | Used | 150 | 302 | 4.0 | 3.7 × 4.2 |

TABLE 2

|  | Inherent viscosity | Refractive index | | Density | Face orientation factor | Tg | Tg-onset | Crystalline size | Thickness variation | Breaking frequency |
|---|---|---|---|---|---|---|---|---|---|---|
|  | (dl/g) | MD | TD | (g/cm³) |  | (° C.) | (° C.) | (Å) | (%) |  |
| Example 1 | 0.63 | 1.64 | 1.66 | 1.371 | 0.130 | 123 | 103 | 52 | 7 | ○ |
| Example 2 | 0.68 | 1.64 | 1.66 | 1.370 | 0.130 | 120 | 102 | 50 | 8 | Δ |
| Example 3 | 0.58 | 1.65 | 1.66 | 1.372 | 0.131 | 118 | 100 | 52 | 9 | Δ |
| Example 4 | 0.70 | 1.64 | 1.66 | 1.370 | 0.130 | 122 | 102 | 50 | 10 | Δ |
| Example 5 | 0.61 | 1.64 | 1.65 | 1.360 | 0.102 | 137 | 102 | 43 | 8 | ○ |
| Example 6 | 0.63 | 1.63 | 1.67 | 1.377 | 0.140 | 115 | 102 | 53 | 7 | ◎ |
| Example 7 | 0.68 | 1.64 | 1.66 | 1.370 | 0.130 | 123 | 103 | 51 | 7 | ◎ |
| Example 8 | 0.65 | 1.64 | 1.66 | 1.370 | 0.130 | 121 | 101 | 53 | 7 | ○ |
| Example 9 | 0.63 | 1.64 | 1.66 | 1.370 | 0.130 | 120 | 102 | 53 | 7 | ○ |
| Example 10 | 0.70 | 1.64 | 1.66 | 1.370 | 0.130 | 124 | 103 | 49 | 7 | ◎ |
| Comparative Example 1 | 0.54 | — | — | — | — | — | — | — | — | — |
| Comparative Example 2 | 0.60 | 1.63 | 1.67 | 1.387 | 0.170 | 102 | 82 | 57 | 18 | Δ |
| Comparative Example 3 | 0.60 | 1.58 | 1.59 | 1.365 | 0.078 | 105 | 98 | 31 | 26 | Δ |
| Comparative Example 4 | 0.60 | 1.58 | 1.59 | 1.386 | 0.075 | 104 | 99 | 51 | 24 | Δ |
| Comparative Example 5 | 0.60 | 1.69 | 1.64 | 1.390 | 0.182 | 103 | 85 | 58 | 16 | Δ |
| Comparative Example 6 | 0.63 | — | — | — | — | — | — | — | — | — |

Note: MD = machine direction, TD = transverse direction

TABLE 3

|  | Heat of fusion | Coarse protrusions on surface |  | Young's modulus (GPa) | | 100° C. heat shrinkage (%) | | Creep compliance (GPa⁻¹) | |
|---|---|---|---|---|---|---|---|---|---|
|  | (J/g) | (pcs/cm²) | Haze (%) | MD | TD | MD | TD | MD | TD |
| Example 1 | 35 | 5 | 2.5 | 4.1 | 5.5 | 0.2 | 0.2 | 0.53 | 0.51 |
| Example 2 | 34 | 40 | 6.0 | 4.1 | 5.5 | 0.2 | 0.2 | 0.54 | 0.52 |
| Example 3 | 38 | 73 | 8.5 | 4.1 | 5.5 | 0.3 | 0.2 | 0.55 | 0.52 |
| Example 4 | 34 | 120 | 12.5 | 4.1 | 5.5 | 0.3 | 0.2 | 0.55 | 0.52 |
| Example 5 | 25 | 7 | 5.2 | 4.1 | 5.2 | 0.0 | 0.1 | 0.53 | 0.49 |
| Example 6 | 37 | 4 | 1.3 | 4.2 | 5.7 | 0.3 | 0.2 | 0.54 | 0.52 |
| Example 7 | 34 | 2 | 2.4 | 4.2 | 5.4 | 0.1 | 0.2 | 0.52 | 0.50 |
| Example 8 | 36 | 4 | 4.0 | 4.1 | 5.5 | 0.3 | 0.3 | 0.54 | 0.51 |
| Example 9 | 35 | 10 | 7.0 | 4.0 | 5.7 | 0.2 | 0.2 | 0.54 | 0.48 |
| Example 10 | 35 | 0 | 1.8 | 4.2 | 5.5 | 0.2 | 0.2 | 0.53 | 0.51 |
| Comparative Example 1 | — | — | — | — | — | — | — | — | — |
| Comparative Example 2 | 47 | 1 | 1.3 | 3.3 | 3.4 | 1.2 | 1.0 | 0.85 | 0.76 |
| Comparative Example 3 | 8 | 1 | 1.4 | 3.2 | 3.2 | 1.4 | 1.2 | 1.40 | 1.22 |
| Comparative Example 4 | 48 | 1 | 1.5 | 3.3 | 3.4 | 1.0 | 0.7 | 0.62 | 0.58 |
| Comparative Example 5 | 46 | 1 | 1.4 | 7.2 | 4.1 | 2.0 | 0.5 | 0.38 | 0.70 |
| Comparative Example 6 | — | — | — | — | — | — | — | — | — |

Note: MD = machine direction, TD = transverse direction
Heat of fusion: Heat of crystal fusion of polyester, measured by DSC.

TABLE 4

|  | PET/PEI master | | | Biaxially oriented film |
|---|---|---|---|---|
|  | PET/PEI content ratio (wt %) | IV ratio of raw materials | Average domain size (μm) | PET/PEI content ratio (wt %) |
| Example 7 | 50/50 | 1.25(0.85/0.68) | 0.3 | 80/20 |
| Example 8 | 30/70 | 1.25(0.85/0.68) | 0.2 | 80/20 |

TABLE 4-continued

|  | PET/PEI master | | | Biaxially oriented film |
|---|---|---|---|---|
|  | PET/PEI content ratio (wt %) | IV ratio of raw materials | Average domain size (μm) | PET/PEI content ratio (wt %) |
| Example 9 | 10/90 | 1.25(0.85/0.68) | 0.1 | 80/20 |
| Example 10 | 50/50 | 1.47(1.00/0.68) | 0.1 | 80/20 |

Note:
The IV ratio of raw materials of the master is (IV of PET as raw material)/(IV of PEI as raw material), and the parenthesized numerals show the respective IV values.

EXAMPLE 11

In this example, a film strengthened by the longitudinal re-stretching and lateral re-stretching method of sequential biaxial stretching was produced.

As described for Example 1, blend chips consisting of 50 parts by weight of PET and 50 parts by weight of "Ultem" 1010 were prepared, and 40 parts by weight of the blend chips and 60 parts by weight of PET chips with an inherent viscosity of 0.75 were dried in vacuum at 180° C. for 3 hours, supplied into a single-screw extruder having a 150 mm dia. screw heated to 290° C., melt-extruded, passed through a fiber stainless steel filter (5 μm cut) at a shear rate of 10 second$^{-1}$, and discharged as a sheet from a T die. The sheet was brought into contact with a cooling drum with a surface temperature of 25° C. at a draw-down ratio of 10 at a speed of 30 m/min, to be solidified and quickly cooled, to obtain a cast film with an inherent viscosity of 0.67 consisting of 80 parts by weight PET and 20 parts by weight of the PEI. The shear rate of the screw during melt extrusion was 120 second$^{-1}$, and the discharge time was 5 minutes. The polymer temperature was 304° C.

In succession, the cast film was stretched at a ratio of 3.5 times in the machine direction at 105° C. by a longitudinal stretcher consisting of plural heated rolls, using the peripheral speed differences of the rolls, held by grips at both the edges, introduced into a first tenter and stretched in the transverse direction at a ratio of 3.5 times at a stretching temperature of 110° C. Then, the longitudinally and laterally stretched film was further re-stretched in the machine direction at a ratio of 1.65 times at a stretching temperature of 160° C. by a longitudinal stretcher consisting of rolls. Furthermore, the film was introduced into a second tenter, re-stretched in the transverse direction at a ratio of 1.4 times at 180° C., heat-treated at 200° C., relaxed by 3% in the transverse direction in a temperature zone of 150° C., relaxed by 1% in the transverse direction in a temperature zone of 100° C., cooled to room temperature, and got the film edges removed, to obtain a 5 μm thick biaxially oriented polyester film. The film properties are shown in Tables 6 and 7. The film obtained here was a high quality polyester film with less surface protrusions on the surface, good clarity, a high Young's modulus in the machine direction and low heat shrinkage. Though the film had been stretched at a high total area ratio of 27.2 times, film breaking slightly occurred, showing good productivity.

EXAMPLE 12

Pellets of polyethylene terephtalate with an inherent viscosity of 0.85 (50 wt %) and pellets of a polyether imide ("Ultem" 1010 (registered trade name of General Electric) (50 wt %) were supplied into a vent two-screw kneading extruder heated to 280° C., and melt-extruded at a shear rate of 100 second$^{-1}$ while being held up for 1 minute, to obtain blend chips containing 50 wt % of the polyether imide.

The obtained blend chips and polyethylene terephthalate with an inherent viscosity of 0.62 were dry-blended at a ratio of 40:60. The blend was dried in vacuum at 180° C. for 3 hours, supplied into an extruder, melt-extruded at 285° C., passed through a fiber stainless steel filter (5 μm cut) at a shear rate of 10 second$^{-1}$, and discharged as a sheet from a T die. The sheet was brought into contact with a cooling drum with a surface temperature of 25° C. at a speed of 4 m/min, to be cooled and solidified, to obtain a substantially non-oriented film containing 20 wt % of the polyether imide.

Then, the obtained film was stretched under the conditions shown in Table 5. At first, it was stretched in the machine direction (MD stretching 1) by a longitudinal stretcher with several rolls disposed, using the peripheral speed differences of the rolls, stretched in the transverse direction (TD stretching 1) by a tenter, furthermore, re-stretched in the machine direction (MD stretching 2) by a longitudinal stretcher consisting of rolls, re-stretched in the transverse direction (TD stretching 2) by a tenter, heat-treated, cooled to room temperature and got the film edges removed, to obtain a 6.9 μm thick biaxially oriented film.

The properties of the obtained film are shown in Tables 6 and 7. A high quality film with the refractive index at least in one direction in conformity with the present invention, and having high stiffness and excellent thermal dimensional stability could be obtained.

EXAMPLES 13 TO 16

Films were formed as described for Example 12, except that the polyether imide content and film forming conditions were as shown in Table 5. The film properties are shown in Tables 6 and 7. Even when the polyether imide content was 40%, 10% or 5%, biaxially oriented films with good thermal dimensional stability and clarity could be obtained.

COMPARATIVE EXAMPLE 7

Blend chips containing 50 wt % of a polyether imide were obtained as described for Example 1. The blend chips and polyethylene terephthalate with an inherent viscosity of 0.62) were mixed at a ratio of 40:60, melt-extruded at 330° C., passed through a fiber stainless steel filter (5 μm cut) at a shear rate of 10 second$^{-1}$, and discharged as a sheet from a T die. Furthermore, the sheet was brought into contact with a cooling drum with a surface temperature of 25° C. at a speed of 4 m/min, to be cooled and solidified, to obtain a substantially non-oriented film containing 20 wt % of the polyether imide.

The obtained film was then stretched under the conditions shown in Table 5 as described for Example 12. The film properties are shown in Tables 6 and 7. Since the film obtained here was less than 1.60 in refractive index in both the machine and transverse directions, it was large in thickness variation and poor in thermal dimensional stability.

EXAMPLE 17

Pellets of polyethylene terephthalate with an inherent viscosity of 0.65 (80 wt %) and pellets of a polyether imide ("Ultem" 1010 (registered trade name of General Electric)) (20 wt %) were supplied into a vent two-screw kneading extruder heated to 280° C. and melt-extruded at a shear rate of 100 second$^{-1}$ while being held up for 1 minute, to obtain polyester chips containing 20 wt % of the polyether imide. The obtained chips were transparent and found to have only one glass transition temperature.

The obtained chips containing the polyether imide were dried in vacuum at 180° C. for 3 hours, supplied into an extruder, melt-extruded at 285° C., passed through a fiber stainless steel filter (10 μm cut) at a shear rate of 10 second$^{-1}$, and discharged as a sheet from a T die. The sheet was brought into contact with a cooling drum with a surface temperature of 25° C. at a speed of 2.5 m/min, to be cooled and solidified, to obtain a substantially non-oriented film.

The film obtained here was then stretched under the conditions shown in Table 5. At first, it was stretched in the machine direction (MD stretching 1) by a longitudinal stretcher with several rolls disposed, using the peripheral speed differences of the rolls, stretched in the transverse direction (TD stretching 1) by a tenter, re-stretched in the machine direction (MD stretching 2) by a longitudinal stretcher consisting of rolls, re-stretched in the transverse direction (TD stretching 2) by a tenter, heat-treated, cooled to room temperature, and got the film edges removed, to obtain a 10.1 μm thick biaxially oriented film.

The properties of the obtained film are shown in Tables 6 and 7. The film had the extrapolated glass transition onset temperature kept in a preferable range, a high Young's modulus and excellent thermal dimensional stability. However, since a preferable raw material blend was not used, the coarse protrusions on the surface increased and the film breaking during film formation occurred more frequently compared to the films of Examples 11 to 16.

EXAMPLES 18 TO 20

Films were formed as described for Example 17, as 10 μm biaxially oriented films, except that the polyether imide content was changed and the conditions shown in Table 5 were used for stretching. The film properties are shown in Tables 6 and 7. When the polyether imide content was 40 wt %, a film with more excellent thermal dimensional stability could be obtained. When the polyether imide content was 5 wt % or 10 wt %, coarse protrusions on the surface increased and film breaking frequency was higher, compared to the film containing 40 wt % of the polyether imide of Example 18.

EXAMPLE 21

In this example, a film strengthened in the machine and transverse directions by simultaneously biaxial stretching was produced.

At first, a cast film was prepared as described for Example 11. Then, the film was held by grips at both the edges, introduced into a simultaneous biaxial tenter, stretched at a total area ratio of 12.25 times (3.5 times in the machine direction and 3.5 times in the transverse direction) at a stretching temperature of 110° C., and in succession, stretched at a total area ratio of 2.25 times (1.5 times in the machine direction and 1.5 times in the transverse direction) at 170° C. The film was then heat-treated at 200° C., relaxed by 2% respectively in the machine and transverse directions in a 150° C. temperature zone, relaxed by 1% respectively in the machine and transverse directions in a 100° C. temperature zone, cooled to room temperature, and got the film edges removed, to obtain a 5 μm thick biaxially oriented polyester film. The film properties are shown in Tables 6 and 7. The film obtained here was a high quality polyester film with less coarse protrusions on the surface, good clarity, high strength and low heat shrinkage. Though the film had been stretched at a high total area ratio of 25.9 times, film breaking slightly occurred, showing good productivity.

TABLE 5

| | PEI content (wt %) | MD stretching 1 | | TD stretching 1 | | MD stretching 2 | | TD stretching 2 | | Heat treatment | | |
|---|---|---|---|---|---|---|---|---|---|---|---|---|
| | | Temperature (° C.) | Ratio | Temperature (° C.) | Ratio | Temperature (° C.) | Ratio | Temperature (° C.) | Ratio | Temperature (° C.) | Time (sec) | Total area ratio |
| Example 11 | 20 | 105 | 3.5 | 110 | 3.5 | 160 | 1.65 | 180 | 1.4 | 200 | 2.0 | 27.2 |
| Example 12 | 20 | 120 | 3.0 | 110 | 4.0 | 155 | 1.7 | 190 | 1.5 | 200 | 0.5 | 30.6 |
| Example 13 | 40 | 130 | 2.8 | 115 | 3.7 | 160 | 1.5 | 195 | 1.5 | 205 | 2.0 | 23.3 |
| Example 14 | 10 | 117 | 3.0 | 105 | 4.0 | 155 | 1.7 | 190 | 1.5 | 190 | 1.0 | 30.6 |
| Example 15 | 5 | 112 | 3.0 | 95 | 4.0 | 155 | 1.7 | 190 | 1.5 | 190 | 1.0 | 30.6 |
| Example 16 | 20 | 120 | 3.5 | 110 | 4.5 | 155 | 1.7 | 190 | 1.5 | 190 | 0.5 | 40.2 |
| Comparative Example 7 | 20 | 130 | 2.8 | 130 | 3.7 | 160 | 1.5 | 195 | 1.5 | 200 | 0.5 | 23.3 |
| Example 17 | 20 | 112 | 3.2 | 90 | 4.6 | 155 | 1.7 | 210 | 1.5 | 210 | 1.0 | 37.5 |
| Example 18 | 40 | 121 | 3.2 | 95 | 4.6 | 160 | 1.7 | 210 | 1.5 | 210 | 1.0 | 37.5 |
| Example 19 | 5 | 112 | 3.2 | 90 | 4.6 | 155 | 1.7 | 210 | 1.5 | 210 | 1.0 | 37.5 |
| Example 20 | 10 | 117 | 3.0 | 105 | 4.0 | 155 | 1.7 | 190 | 1.5 | 190 | 1.0 | 30.6 |

TABLE 6

|  | Inherent viscosity (dl/g) | Refractive index MD | Refractive index TD | Density (g/cm³) | Face orientation factor | Tg (°C.) | Tg-onset (°C.) | Crystalline size (Å) | Thickness variation (%) | Breaking frequency |
|---|---|---|---|---|---|---|---|---|---|---|
| Example 11 | 0.68 | 1.67 | 1.62 | 1.372 | 0.120 | 127 | 103 | 52 | 4 | ○ |
| Example 12 | 0.60 | 1.65 | 1.67 | 1.370 | 0.127 | 128 | 102 | 50 | 5 | ○ |
| Example 13 | 0.62 | 1.66 | 1.66 | 1.360 | 0.102 | 141 | 116 | 43 | 6 | ○ |
| Example 14 | 0.60 | 1.65 | 1.68 | 1.375 | 0.158 | 118 | 101 | 53 | 5 | ○ |
| Example 15 | 0.60 | 1.65 | 1.68 | 1.410 | 0.162 | 113 | 96 | 53 | 6 | ○ |
| Example 16 | 0.60 | 1.63 | 1.68 | 1.380 | 0.149 | 115 | 102 | 52 | 7 | ○ |
| Comparative Example 7 | 0.60 | 1.58 | 1.59 | 1.365 | 0.070 | 107 | 101 | 35 | 18 | X |
| Example 17 | 0.60 | 1.64 | 1.66 | 1.372 | 0.122 | 124 | 102 | 54 | 10 | Δ |
| Example 18 | 0.60 | 1.64 | 1.66 | 1.365 | 0.107 | 139 | 117 | 43 | 11 | Δ |
| Example 19 | 0.60 | 1.64 | 1.66 | 1.373 | 0.155 | 112 | 95 | 55 | 12 | Δ |
| Example 20 | 0.60 | 1.64 | 1.66 | 1.375 | 0.133 | 122 | 102 | 54 | 12 | Δ |
| Example 21 | 0.68 | 1.65 | 1.65 | 1.371 | 0.127 | 126 | 103 | 52 | 5 | ○ |

TABLE 7

|  | Heat of fusion (J/g) | Coarse protrusions on surface (pcs/cm²) | Haze (%) | Young's modulus (GPa) MD | Young's modulus (GPa) TD | 100° C. heat shrinkage (%) MD | 100° C. heat shrinkage (%) TD | Creep compliance (GPa⁻¹) MD | Creep compliance (GPa⁻¹) TD |
|---|---|---|---|---|---|---|---|---|---|
| Example 11 | 34 | 2 | 3.0 | 7.4 | 5.0 | 0.45 | 0.3 | 0.21 | 0.34 |
| Example 12 | 31 | 5 | 1.2 | 6.8 | 8.6 | 0.0 | 0.1 | 0.26 | 0.22 |
| Example 13 | 24 | 4 | 1.3 | 7.2 | 9.2 | 0.0 | 0.1 | 0.20 | 0.17 |
| Example 14 | 38 | 5 | 1.1 | 6.4 | 8.8 | 0.2 | 0.1 | 0.24 | 0.20 |
| Example 15 | 41 | 6 | 0.5 | 6.5 | 8.5 | 0.6 | 0.3 | 0.32 | 0.29 |
| Example 16 | 32 | 5 | 1.2 | 7.3 | 8.2 | 0.2 | 0.3 | 0.54 | 0.52 |
| Comparative Example 7 | 29 | 5 | 15.5 | 3.4 | 4.2 | 2.1 | 2.3 | 0.61 | 0.75 |
| Example 17 | 34 | 62 | 5.0 | 6.8 | 8.6 | 0.3 | 0.1 | 0.26 | 0.22 |
| Example 18 | 28 | 28 | 9.0 | 7.2 | 9.2 | 0.1 | 0.0 | 0.20 | 0.17 |
| Example 19 | 42 | 50 | 6.8 | 6.5 | 8.5 | 0.8 | 0.3 | 0.32 | 0.29 |
| Example 20 | 38 | 55 | 6.3 | 6.4 | 8.4 | 0.3 | 0.2 | 0.28 | 0.24 |
| Example 21 | 33 | 2 | 2.8 | 6.0 | 6.0 | 0.4 | 0.4 | 0.29 | 0.29 |

EXAMPLE 22

Blend chips containing 50 wt % of a polyether imide (PET/PEI (I)) were obtained as described for Example 1, except that the PET used contained 0.40 wt % of spherical silica particles with an average size of 0.07 μm. Furthermore, blend chips containing 50 wt % of a polyether imide (PET/PEI (II)) were obtained as described for Example 1, except that the PET used contained 0.5 wt % of spherical crosslinked polystyrene particles with an average size of 0.3 μm and 0.025 wt % of spherical crosslinked polystyrene particles with an average size of 0.8 μm.

Then, a multilayed film was prepared using two extruders A and B, by letting the extruder A form the magnetic face and the extruder B form the running face. Into the extruder A heated to 280° C., 40 parts by weight of the pellets of PET/PEI (I) and 60 parts by weight of PET with an inherent viscosity of 0.65 respectively dried in vacuum at 180° C. for 3 hours were supplied, and on the other hand, into the extruder B heated to 280° C., 40 parts by weight of the pellets of PET/PEI (II) and 60 parts by weight of PET with an inherent viscosity of 0.65 respectively dried in vacuum at 180° C. for 3 hours were supplied. Both the mixtures were joined in a T die (lamination ratio I/II=10/1), and the laminate was brought into contact with a casting drum with a surface temperature of 25° C. electrostatically, to be cooled and solidified, to obtain a cast multilayered film.

The film obtained here was stretched under the conditions shown in Table 8, to obtain a 7.5 μm thick biaxially oriented film.

The basic properties of the obtained film are shown in Table 9, and the properties as a magnetic tape are shown in Table 10. The film of this example containing a polyether imide were excellent in strength and thermal dimensional stability and also far excellent in magnetic tape properties such as running durability, storage stability, high speed abrasion resistance and electromagnetic conversion property, compared to the film of Comparative Example 8 consisting of PET alone.

EXAMPLES 23 AND 24, AND COMPARATIVE EXAMPLE 8

Cast mulilayered films were prepared as described for Example 22, except that the polyether imide content was changed as shown in Table 8. The amount of the particles in the raw material blend was adjusted to ensure that the rates of the particles contained in the two layers of a film might be the same as in Example 22. Then, films were formed as described for Example 22 under the conditions shown in Table 8, to obtain 7.5 μm thick biaxially oriented films.

TABLE 8

|  | PEI content (wt %) | MD stretching 1 Temperature (° C.) | MD stretching 1 Ratio | TD stretching 1 Temperature (° C.) | TD stretching 1 Ratio | MD stretching 2 Temperature (° C.) | MD stretching 2 Ratio | TD stretching 2 Temperature (° C.) | TD stretching 2 Ratio | Heat treatment Temperature (° C.) | Heat treatment Time (sec) | Total area ratio |
|---|---|---|---|---|---|---|---|---|---|---|---|---|
| Example 22 | 20 | 112 | 3.2 | 90 | 4.6 | 155 | 1.7 | 210 | 1.5 | 210 | 1.0 | 37.5 |
| Example 23 | 10 | 107 | 2.8 | 90 | 4.6 | 155 | 1.7 | 210 | 1.5 | 210 | 1.0 | 37.5 |
| Example 24 | 2 | 102 | 2.8 | 90 | 4.6 | 155 | 1.7 | 210 | 1.5 | 210 | 1.0 | 37.5 |
| Comparative Example 8 | 0 | 102 | 3.2 | 90 | 4.6 | 155 | 1.7 | 210 | 1.5 | 210 | 1.0 | 37.5 |

TABLE 9

|  | Refractive index MD | Refractive index TD | Density (g/cm³) | Tg-onset (° C.) | Surface roughness Ra (nm) Magnetic face | Surface roughness Ra (nm) Running face | Young's modulus (GPa) MD | Young's modulus (GPa) TD | 100° C. heat shrinkage (%) MD | 100° C. heat shrinkage (%) TD | Creep compliance (GPa⁻¹) MD | Creep compliance (GPa⁻¹) TD |
|---|---|---|---|---|---|---|---|---|---|---|---|---|
| Example 22 | 1.64 | 1.67 | 1.371 | 100 | 4.0 | 10.5 | 6.7 | 8.5 | 0.3 | 0.2 | 0.27 | 0.23 |
| Example 23 | 1.65 | 1.68 | 1.377 | 93 | 4.0 | 10.4 | 6.8 | 8.4 | 0.4 | 0.3 | 0.35 | 0.34 |
| Example 24 | 1.65 | 1.67 | 1.384 | 88 | 4.0 | 10.7 | 6.5 | 8.3 | 0.8 | 0.4 | 0.37 | 0.36 |
| Comparative Example 8 | 1.65 | 1.67 | 1.392 | 81 | 4.2 | 10.6 | 5.2 | 6.8 | 3.0 | 1.9 | 0.43 | 0.40 |

TABLE 10

|  | High speed abrasion resistance | Electromagnetic conversion property | Running durability | Storage stability |
|---|---|---|---|---|
| Example 22 | ○ | ○ | ○ | ○ |
| Example 23 | ○ | ○ | ○ | ○ |
| Exanlple 24 | ○ | Δ | Δ | Δ |
| Comparative Example 8 | X | X | X | X |

The evaluation results of the films obtained here are shown in Tables 9 and 10. When the extrapolated glass transition onset temperature was lower than 90° C., the practical properties as a magnetic tape declined, though strength and thermal dimensional stability were excellent.

EXAMPLE 25

A cast film of PET/PEI (90 parts by weight/10 parts by weight) was obtained as described for Example 1, except that a raw material blend of PET/PEI (50/50) prepared as described for Example 1 and PET (inherent viscosity 0.65, glass transition temperature 75° C., melting point 255° C., containing 0.25 wt % of cohesive silica particles with an average particle size of 0.3 μm) were used. The film was coated with a coating material composed as follows, by a gravure coater, as a fusion preventive layer with a thickness of 0.5 μm after drying.

| (Composition of coating material) | |
|---|---|
| Acrylate | 14.0 wt % |
| Amino modified silicone | 5.9 wt % |
| Isocyanate | 0.1 wt % |
| Water | 80.0 wt % |

Then, the cast film was stretched at a ratio of 3.8 times in the machine direction at 110° C. by a longitudinal stretcher consisting of plural heated rolls, using the peripheral speed differences of the rolls, held by grips at both the edges, introduced into a tenter, stretched in the transverse direction at a ratio of 4.2 times at a stretching temperature of 105° C., heat-treated at 235° C., relaxed by 1% in the transverse direction in a cooling zone controlled at 150° C., cooled to room temperature, and got the film edges removed, to obtain a 3.5 μm thick biaxially oriented polyester film. The film was processed and the practical properties as a film for thermal transfer ribbons were evaluated. As shown in Table 11, the film had very excellent properties as a film for thermal transfer ribbons, compared to the film of Comparative Example 9 consisting of PET alone.

COMPARATIVE EXAMPLE 9

A film was formed as described for Example 25, as a 3.5 μm thick biaxially oriented film, except that PET (inherent viscosity 0.65, glass transition temperature 75° C., melting point 255° C., containing 0.20 wt % of cohesive silica particles with an average particle size of 0.3 μm) not containing the polyether imide was used as a raw material supplied into the extruder, that the longitudinal stretching temperature was set at 95° C., and that the lateral stretching temperature was set at 90° C. The properties of the obtained film are shown in Table 11. The film consisting of PET alone was likely to be wrinkled during printing, and could not be used as a film for thermal transfer ribbons.

EXAMPLE 26

A 1.5 μm thick film was obtained as described for Example 25, except that a raw material blend of PET/PEI (50/50) prepared as described for Example 1 and PET (inherent viscosity 0.65, glass transition temperature 75° C., melting point 255°, containing 0.125 wt % of calcium phosphate particles with an average particle size of 0.2 μm)

were used to form a PET/PEI film containing 10 wt % of the PEI. The practical properties of the film obtained here as a film for capacitors were evaluated. As shown in Table 12, the film had very excellent properties as a film for capacitors.

COMPARATIVE EXAMPLE 10

A film was formed as described for Example 26, except that PET (inherent viscosity 0.65, glass transition temperature 75° C., melting point 255° C., containing 0.10 wt % of calcium phosphate particles with an average particle size of 0.2 μm) was used as a raw material supplied into an extruder, that the longitudinal stretching temperature was 95° C., and that the transverse stretching temperature was 90° C.

The thermostability of the obtained film was inferior to that of the film of Example 26 as shown in Table 12.

EXAMPLE 27

Pellets of a copolymer consisting of PET and polyethylene isophthalate (PET/I) (the copolymer hereinafter abbreviated as PET-PET/I had an inherent viscosity of 0.70 and a melting point of 215° C., being 80/20 in molar ratio, containing 0.25 wt % of cohesive silica with an average particle size of 1.0 μm) were dried in vacuum at 120° C. for 3 hours, to be preliminarily crystallized. Then, 80 parts by weight of the PET-PET/I and 20 parts by weight of a raw material blend of PET/PEI (50/50) prepared as described for Example 1 were mixed, dried in vacuum at 180° C. for 3 hours, supplied into an extruder heated to 270° C., and discharged as a sheet from a T die, and the sheet was brought into contact with a cooling drum with a surface temperature of 25° C. by electrostatic force, to be cooled and solidified, to obtain a cast film containing 10 wt % of the PEI.

The cast film was stretched at a ratio of 3.8 times in the machine direction at 110° C. by a longitudinal stretcher consisting of plural heated rolls, using the peripheral speed differences of the rolls, held by grips at both the edges, introduced into a tenter, stretched in the transverse direction at a ratio of 4.2 times at a stretching temperature of 105° C., heat-treated at 110° C., passed through two cooling zones controlled at 80° C. and 60° C., cooled to room temperature, got the film edges removed, and wound. The film thickness was kept at 1.7 μm by adjusting the extruded quantity. The obtained film was 27 J/g in the heat of crystal fusion ΔH and 18 Å in crystalline size. The film was bonded to Japanese paper with an areal unit weight of 12 g/m², to make a heat-sensitive mimeograph stencil, and the practical properties as a heat-sensitive mimeograph stencil were evaluated.

The properties of the obtained film are shown in Table 13. The film was more excellent than the film consisting of PET alone in the practical properties after having been processed as a heat-sensitive mimeograph stencil, and was also small in the heat shrinkage at 65° C. to cause curling, being very excellent as a film for heat-sensitive mimeograph stencils.

COMPARATIVE EXAMPLE 11

Pellets of PET-PET/I copolymer (glass transition temperature 75° C. melting point 215° C., copolymer ratio 80/20, containing 0.2 wt % of cohesive silica with an average particle size of 1.0 μm) were dried in vacuum at 120° C. for 3 hours, to be preliminarily crystallized, dried in vacuum at 180° C. for 3 hours, supplied into an extruder heated to 270° C., and discharged as a sheet from a T die. The sheet was brought into contact with a cooling drum with a surface temperature of 25° C. by electrostatic force, to be cooled and solidified, to obtain a cast film. The cast film was biaxially stretched and heat-treated as described for Example 27, except that the longitudinal stretching temperature was 95° C. and that the lateral stretching temperature was 90° C. The film was then gradually cooled to room temperature and wound. The film thickness was kept at 1.7 μm by adjusting the extruded quantity. The properties of the obtained film are shown in Table 13.

EXAMPLE 28

Twenty parts by weight of a raw material blend of PET/PEI (50/50) prepared as described for Example 1 and 80 parts by weight of PET (inherent viscosity 0.65, containing 0.25 wt % of spherical crosslinked polystyrene particles with an average particle size of 0.3 μm) were dried in vacuum at 180° C. for 3 hours, supplied into an extruder heated to 280° C. and discharged as a sheet from a T die. The sheet was brought into contact with a cooling drum with a surface temperature of 25° C. by electrostatic force, to be cooled and solidified, to obtain a cast film containing 10 wt % of the PEI.

The cast film was then stretched at a ratio of 3.8 times in the machine direction at 100° C. by a longitudinal stretcher consisting of plural heated rolls, using the peripheral speed differences of the roll, held by grips at both the edges, introduced into a tenter, stretched in the transverse direction at a ratio of 3.9 times at a stretching temperature of 110° C., and heated stepwise to 130° C., 180° C. and 200° C. for heat treatment. In succession, it was relaxed by 2% in the transverse direction in a cooling zone controlled at 100° C., cooled to room temperature, got the film edges removed, and wound. The film thickness was kept at 62 μm by adjusting the extruded quantity.

The film was processed for magnetic recording media, and practical properties as a film for floppy discs were evaluated. The results are shown in Table 14. The film was excellent in thermal dimensional stability, being very excellent as a film for floppy discs compared to the film of Comparative Example 12 consisting of PET alone.

COMPARATIVE EXAMPLE 12

PET (inherent viscosity 0.65, containing 0.20 wt % of spherical crosslinked polystyrene particles with an average particle size of 0.3 μm) was dried in vacuum at 180° C. for 3 hours, supplied into an extruder heated to 280° C. and discharged as a sheet from a T die, and the sheet was brought into contact with a cooling drum with a surface temperature of 25° C. by electrostatic force, to be cooled and solidified, to obtain a cast film.

The cast film was then formed into a 62 μm thick biaxially oriented film as described for Example 28, except that the longitudinal stretching temperature was 95° C. and that the lateral stretching temperature was 90° C.

The obtained film was processed for magnetic recording media as described for Example 28, and the practical properties as a film for floppy discs were evaluated. The results are shown in Table 14.

TABLE 11

| | Refractive index | | Density | Tg-onset | Thickness variation | |
|---|---|---|---|---|---|---|
| | MD | TD | (g/cm³) | (° C.) | (%) | Printability |
| Example 25 | 1.63 | 1.66 | 1.378 | 93 | 7 | ○ |
| Comparative Example 9 | 1.63 | 1.67 | 1.395 | 82 | 16 | X |

TABLE 12

| | Refractive index | | Density | Tg-onset | Thickness variation | Insulation resistance | Dielectric breakdown voltage | |
|---|---|---|---|---|---|---|---|---|
| | MD | TD | (g/cm³) | (° C.) | (%) | | 20° C., 65% RH | 125° C., 65% RH |
| Example 26 | 1.63 | 1.66 | 1.378 | 93 | 8 | ◎ | ○ | ○ |
| Comparative Example 10 | 1.63 | 1.67 | 1.395 | 82 | 16 | X | X | X |

TABLE 13

| | Refractive index | | Density | Tg-conset | Thickness variation | Practical properties for thermal mimeography | | | | 65° C. heat shrinkage | 100° C. heat shrinkage |
|---|---|---|---|---|---|---|---|---|---|---|---|
| | MD | TD | (g/cm³) | (° C.) | (%) | Perforation sensitivity | Independent perforability | Character printability | Solid printability | MD/TD (%) | MD/TD (%) |
| Example 27 | 1.63 | 1.64 | 1.343 | 91 | 9 | ○ | ○ | ○ | ○ | 0.2/0.3 | 35.0/32.0 |
| Comparative Example 11 | 1.62 | 1.64 | 1.352 | 79 | 17 | X | X | Δ | Δ | 1.1/1.2 | 28.0/22.0 |

TABLE 14

| | Refractive index | | Density | Tg-onset | Thickness variation (%) | Tracking resistance | | Scratch resistance |
|---|---|---|---|---|---|---|---|---|
| | MD | TD | (g/cm³) | (° C.) | | Under temperature change | Under humidity change | |
| Example 28 | 1.63 | 1.66 | 1.378 | 93 | 9 | ○ | ○ | ○ |
| Comparative Example 12 | 1.63 | 1.67 | 1.395 | 82 | 16 | X | X | X |

Industrial Applicability

The biaxially oriented polyester film consisting of a polyester (A) mainly composed of ethylene terephthalate and a polyether imide (B), having a single glass transition temperature and having a refractive index of 1.60 to 1.80 at least in either the machine direction or the transverse direction, disclosed in the present invention is good in thermal dimensional stability and clarity and excellent in productivity. The film of the present invention is very high in industrial value for high density magnetic recording application, but can also be very widely and effectively utilized for various film applications such as electric capacitors, thermal transfer ribbons, heat-sensitive mimeograph stencils, floppy discs, printing plates & cards, etc.

The invention claimed is:

1. A process for producing a biaxially oriented polyester film, comprising the steps of:
    preparing a raw material blend of a polyester (A) mainly composed of ethylene terephthalate and a polyether imide (B) of 70/30–10/90 as (A/8) ratio by weight;
    melt-extruding polyester (A) with said raw material blend to mold a resin sheet with a single glass transition temperature; and
    stretching the resin sheet at a ratio of 3.0 to 10 times in the machine direction and at a ratio of 3.0 to 10 times in the transverse direction, wherein the biaxially oriented polyester film has a refractive index of 1.60 to 1.80 at least in either the machine direction or the transverse direction.

2. A process for producing a biaxially oriented polyester film, according to claim 1, wherein the biaxially oriented film is heat-set at 100° C. to 260° C.

3. A process for producing a biaxially oriented polyester film, according to claim 1, wherein the melt extrusion is effected by an extruder (1) at a screw shear rate of 30 second$^{-1}$ to less than 300 second$^{-1}$, (2) at a polymer temperature of 280° C. to 320° C., (3) with the polymer discharge time set at 60 seconds to 10 minutes.

* * * * *